US011326020B2

(12) United States Patent
Yoshimura et al.

(10) Patent No.: US 11,326,020 B2
(45) Date of Patent: May 10, 2022

(54) COMPOSITION FOR TREATING THREE-DIMENSIONAL OBJECT PRECURSOR

(71) Applicant: KAO CORPORATION, Tokyo (JP)

(72) Inventors: Tadanori Yoshimura, Wakayama (JP); Hiroki Sawada, Wakayama (JP); Akihiro Onoue, Nakayama (JP)

(73) Assignee: KAO CORPORATION, Tokyo (JP)

( * ) Notice: Subject to any disclaimer, the term of this patent is extended or adjusted under 35 U.S.C. 154(b) by 468 days.

(21) Appl. No.: 16/323,354

(22) PCT Filed: Jul. 25, 2017

(86) PCT No.: PCT/JP2017/026821
§ 371 (c)(1),
(2) Date: Feb. 5, 2019

(87) PCT Pub. No.: WO2018/025704
PCT Pub. Date: Feb. 8, 2018

(65) Prior Publication Data
US 2020/0157276 A1 May 21, 2020

(30) Foreign Application Priority Data

Aug. 5, 2016 (JP) .............................. JP2016-154731
Jul. 21, 2017 (JP) .............................. JP2017-141755

(51) Int. Cl.
| C08G 63/688 | (2006.01) |
| B33Y 40/00 | (2020.01) |
| B33Y 70/00 | (2020.01) |
| B29C 64/40 | (2017.01) |
| C08G 69/42 | (2006.01) |
| B33Y 10/00 | (2015.01) |
| B29C 64/118 | (2017.01) |

(52) U.S. Cl.
CPC .......... C08G 63/6886 (2013.01); B29C 64/40 (2017.08); B33Y 40/00 (2014.12); B33Y 70/00 (2014.12); C08G 69/42 (2013.01); B29C 64/118 (2017.08); B33Y 10/00 (2014.12)

(58) Field of Classification Search
CPC .. C08G 63/6886; C08G 69/42; C08G 69/265; C08G 69/40; C08G 63/197; B33Y 40/00; B33Y 70/00; B33Y 10/00; B29C 64/40; B29C 64/118
See application file for complete search history.

(56) References Cited

U.S. PATENT DOCUMENTS

| 5,924,359 | A | 7/1999 | Watanabe |
| 6,790,403 | B1 | 9/2004 | Priedeman, Jr. et al. |
| 2005/0004282 | A1 | 1/2005 | Priedeman, Jr. et al. |
| 2017/0015063 | A1* | 1/2017 | Hanyu .................. B29C 64/165 |
| 2017/0232684 | A1 | 8/2017 | Yoshimura et al. |
| 2017/0240675 | A1 | 8/2017 | Yoshimura et al. |
| 2017/0355133 | A1* | 12/2017 | Shimada ................. B29C 64/40 |
| 2018/0009160 | A1* | 1/2018 | Sawada ............. C08G 63/6886 |
| 2018/0030234 | A1* | 2/2018 | Priedeman, Jr. ....... B33Y 70/00 |
| 2018/0179332 | A1* | 6/2018 | Priedeman, Jr. ...... B29C 64/118 |
| 2019/0062499 | A1* | 2/2019 | Jeol ......................... C08G 69/40 |
| 2020/0324457 | A1* | 10/2020 | Singletary ............. B29C 64/364 |

FOREIGN PATENT DOCUMENTS

| CN | 1164471 A | 11/1997 |
| CN | 101687220 A | 3/2010 |
| CN | 109071802 A | 12/2018 |
| JP | 2008-507619 A | 3/2008 |
| JP | 2008-158350 A | 7/2008 |
| JP | 2014-83744 A | 5/2014 |
| JP | 2014083744 A * | 5/2014 |
| JP | 2016-78284 A | 5/2016 |
| JP | 2016-79379 A | 5/2016 |
| WO | WO 00/62994 A1 | 10/2000 |
| WO | WO 2006/020279 A2 | 2/2006 |
| WO | WO 2008/156125 A2 | 12/2008 |
| WO | WO-2015087811 A1 | 6/2015 |
| WO | WO 2016/059986 A1 | 4/2016 |

(Continued)

OTHER PUBLICATIONS

English translation of JP-2014083744-A, by EPO. (Year: 2014).*
"A Method for Estimating Both the Solubility Parameters and Molar Volumes of Liquids," Robert F. Fedors, Polymer Engineering and Science, 14, 147-154 (1974) (Year: 1974).*
Chinese Office Action and Search Report for Chinese Application No. 201780047246.6, dated Aug. 24, 2020, with English translation of the Search Report.
European Office Action for European Application No. 17836810.6, dated Sep. 10, 2020.
Extended European Search Report, dated Feb. 13, 2020, for European Application No. 17836810.6.

(Continued)

Primary Examiner — Leith S Shafi
Assistant Examiner — Inja Song
(74) Attorney, Agent, or Firm — Element IP, PLC

(57) ABSTRACT

The present invention is a composition of an agent for treating a precursor of a three-dimensional object for removing a support material from a precursor of the three-dimensional object containing a three-dimensional object and the support material, the composition containing water and a water-soluble compound having a solubility parameter (SP value) calculated by using the Fedors' method of 8 (cal/cm$^3$)$^{1/2}$ to 13 (cal/cm$^3$)$^{1/2}$. The present invention can provide a composition of an agent for treating a precursor of a three-dimensional object that is capable of removing the support material quickly and a method for manufacturing a three-dimensional object using the composition of an agent for treating a precursor of a three-dimensional object by a fused deposition modeling system.

11 Claims, No Drawings

(56) References Cited

FOREIGN PATENT DOCUMENTS

WO     WO 2016/125860 A1    8/2016
WO     WO 2017/167691 A1    10/2017

OTHER PUBLICATIONS

International Preliminary Report on Patentability and English translation of the Written Opinion of the International Searching Authority, dated Feb. 14, 2019, for International Application No. PCT/JP2017/026821.
International Search Report for PCT/JP2017/026821 dated Sep. 5, 2017.

* cited by examiner

COMPOSITION FOR TREATING THREE-DIMENSIONAL OBJECT PRECURSOR

TECHNICAL FIELD

The present invention relates to a composition of an agent for treating a precursor of a three-dimensional object.

BACKGROUND ART

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, a stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of the method of removing the support material from the precursor of the three-dimensional object is a method of using a methacrylic acid copolymer as the support material and soaking the precursor of the three-dimensional object in an aqueous strong alkaline solution to remove the support material (for example, JP-T-2008-507619). The method utilizes that carboxylic acid in the methacrylic acid copolymer is neutralized by an alkali and dissolved in an aqueous strong alkaline solution.

SUMMARY OF THE INVENTION

The composition of the agent for treating the precursor of the three-dimensional object according to the present invention is the composition of the agent for treating the precursor of the three-dimensional object for removing the support material from the precursor of the three-dimensional object containing the three-dimensional object and the support material, the composition containing water and a water-soluble compound having a solubility parameter (SP value) calculated by using the Fedors' method of 8 $(cal/cm^3)^{1/2}$ to 13 $(cal/cm^3)^{1/2}$.

DETAILED DESCRIPTION OF THE INVENTION

In the case of using, as a support material, the methacrylic acid copolymer disclosed in the document JP-A-2008-507619, an aqueous strong alkaline solution needs to be used to remove the support material from the precursor of a three-dimensional object. However, this aqueous strong alkaline solution is large in danger for people and in load onto the environment. Moreover, when the precursor of the three-dimensional object is immersed in the aqueous strong alkaline solution for a long term, the three-dimensional object in the precursor of the three-dimensional object tends to be eroded by the alkali. Thus, restrictions have been given to the use of any polyester resin, such as polylactic acid (PLA), which is low in resistance against alkalines, as a raw material of the three-dimensional object.

A support material that can be removed by neutral water with pH of 6 to 8 that is not a strong alkaline aqueous solution may be used in order to solve the problem. However, it takes a time to remove the support material by using the neutral water.

The present invention provides a composition of an agent for treating a precursor of a three-dimensional object that is capable of removing the support material quickly and a method for manufacturing a three-dimensional object using the composition of the agent for treating the precursor of the three-dimensional object by a fused deposition modeling system.

The composition of the agent for treating the precursor of the three-dimensional object according to the present invention is the composition of the agent for treating the precursor of the three-dimensional object for removing the support material from the precursor of the three-dimensional object containing the three-dimensional object and the support material, the composition containing water and a water-soluble compound having a solubility parameter (SP value) calculated by using the Fedors' method of 8 $(cal/cm^3)^{1/2}$ to 13 $(cal/cm^3)^{1/2}$.

The present invention can provide a composition of the agent for treating the precursor of the three-dimensional object that is capable of removing the support material quickly and a method for manufacturing the three-dimensional object using the composition of the agent for treating the precursor of the three-dimensional object by a fused deposition modeling system.

Hereinafter, the embodiment of the present invention will be described.

<Composition of Agent for Treating Precursor of Three-Dimensional Object>

The composition of the agent for treating the precursor of the three-dimensional object according to the present embodiment (hereinafter also referred to merely as the "composition of the treating agent") is the composition of the agent for treating the precursor of the three-dimensional object for removing the support material from the precursor of the three-dimensional object containing the three-dimensional object and the support material, the composition containing water and a water-soluble compound having a solubility parameter (SP value) calculated by using the Fedors' method of 8 $(cal/cm^3)^{1/2}$ to 13 $(cal/cm^3)^{1/2}$. The composition of the treating agent of the present embodiment is capable of removing the support material quickly. The reason why the composition of the treating agent has such advantageous effects is unclear. However, the reason would be as follows:

A copolymer having a hydrophilic group such as a sulfonate group and a sulfate group may be used as the soluble material for three-dimensional modeling for the support material in order to remove the support material by using neutral water. However, if the content (mol %) of the aromatic ring in the copolymer is increased in order to melt the soluble material for three-dimensional modeling for the support material at a high temperature for modeling, the solubility of the material in neutral water decreases even if there is no change in the content (mol %) of the hydrophilic group. This may be because the aromatic ring works mainly as a hydrophobic group, which lowers the solubility of the material in neutral water. The mobility of the composition of the treating agent according to the present embodiment near the hydrophilic group may be increased and the mobility of the aromatic ring portion of the material that works as a hydrophobic group may be increased by a water-soluble compound having a specific SP value to remove the support material quickly.

[Water Soluble Compound]

The solubility parameter (SP value) calculated by using the Fedors' method of the water-soluble compound is 8 $(cal/cm^3)^{1/2}$ to 13 $(cal/cm^3)^{1/2}$. "The solubility parameter (SP value)" in the present specification is a value δ obtained by the following formula in the Fedors' method [Robert F. Fedors, Polymer Engineering and Science, 14, 147-154 (1974)].

Fedors' Formula: $δ=(ΣΔei/ΣΔvi)^{1/2}$

[Unit:$(cal/cm^3)^{1/2}$]

[Δei: Evaporation energy (cal/mol) of an atom and a group of atoms, Δvi: Molar volume ($cm^3$/mol)]

In the present specification, the water-soluble compound is a compound that forms a uniform layer when being mixing with water so that the concentration of the compound becomes 20% by mass.

From a viewpoint of exhibiting good removability of the support material, the SP value of the water-soluble compound is 8 $(cal/cm^3)^{1/2}$ or more, preferably 8.1 $(cal/cm^3)^{1/2}$ or more, and more preferably 8.2 $(cal/cm^3)^{1/2}$ or more. From the same viewpoint, the SP value of the water-soluble compound is 13 $(cal/cm^3)^{1/2}$ or less, preferably 12 $(cal/cm^3)^{1/2}$ or less, and more preferably 11 $(cal/cm^3)^{1/2}$ or less.

Examples of the water-soluble compound include a water-soluble compound represented by the following formulas (1) to (4).

[Formula 1]

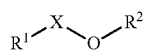

(1)

(In the formula (1), from a viewpoint of exhibiting good removability of the support material, $R^1$ is preferably an alkyl group having 2 to 22 carbon atoms, a hydroxy group, a benzyl group, an acetyl group, or an acetoxy group; and X is preferably an alkylene group having 1 to 12 carbon atoms that may have a hydroxy group or a $(EO)_{m1}(PO)_{n1}$ group, wherein m1 is an average addition mole number of an oxyethylene group {-EO-} and preferably an integer of 1 to 200, and n1 is an average addition mole number of an oxypropylene group {—PO—} and preferably an integer of 0 to 50. From a viewpoint of exhibiting good removability of the support material, $R^2$ is preferably an alkyl group having 2 to 8 carbon atoms in a case $R^1$ is an alkyl group having 2 to 4 carbon atoms; $R^2$ is preferably an alkyl group having 4 to 8 carbon atoms in a case $R^1$ is a hydroxy group and X is an alkylene group having 2 or 3 carbon atoms that has no hydroxy group; $R^2$ is preferably an allyl group in a case $R^1$ is a hydroxy group and X is an alkylene group having 3 or 8 carbon atoms that has a hydroxy group; $R^2$ is preferably an alkyl group having 2 to 8 carbon atoms in a case $R^1$ is an acetyl group, X is a $(EO)_{m1}(PO)_{n1}$ group, m1 is an integer from 1 to 4, and n1 is 0; and $R^2$ is preferably a hydrogen atom in a case $R^1$ is a benzyl group or an alkyl group having 4 to 22 carbon atoms, X is a $(EO)_{m1}(PO)_{n1}$ group, m1 is an integer from 1 to 200, and n1 is 0 to 50.)

In the formula (1), from a viewpoint of exhibiting good removability of the support material, $R^1$ is preferably an alkyl group having 2 to 22 carbon atoms, a hydroxy group, a benzyl group, an acetyl group, or an acetoxy group; more preferably an alkyl group having 2 to 12 carbon atoms, a hydroxy group, or an acetoxy group; further preferably an alkyl group having 2 to 8 carbon atoms, a hydroxy group, or an acetoxy group; further more preferably an alkyl group having 2 to 4 carbon atoms, a hydroxy group, or an acetoxy group; furthermore preferably an alkyl group having 2 to 4 carbon atoms or a hydroxy group; and further more preferably a hydroxy group.

In the formula (1), from a viewpoint of exhibiting good removability of the support material, X is preferably an alkylene group having 1 to 12 carbon atoms that may have a hydroxy group or a $(EO)_{m1}(PO)_{n1}$ group, more preferably an alkylene group having 1 to 12 carbon atoms or a $(EO)_{m1}(PO)_{n1}$ group, and further preferably an alkylene group having 1 to 8 carbon atoms or a $(EO)_{m1}(PO)_{n1}$ group. From a viewpoint of exhibiting good removability of the support material, m1 is preferably an integer of 1 to 200, more preferably an integer of 1 to 60, further preferably an integer of 1 to 10, and further more preferably 1 to 3. From a viewpoint of exhibiting good removability of the support material, n1 is preferably an integer of 0 to 50, more preferably an integer of 1 to 10, and further preferably an integer of 1 to 3. If $(EO)_{m1}(PO)_{n1}$ consists of an oxyethylene group and an oxypropylene group, the arrangement of EO and PO may be block or random. If there are two or more blocks consisting of EO, the number of EO in each block may be same or different. If there are two or more blocks consisting of PO, the number of PO in each block also may be same or different.

From a viewpoint of exhibiting good removability of the support material, $R^2$ is preferably an alkyl group having 2 to 8 carbon atoms and more preferably an alkyl group having 2 to 6 carbon atoms in a case $R^1$ is an alkyl group having 2 to 4 carbon atoms.

From a viewpoint of exhibiting good removability of the support material, $R^2$ is preferably an alkyl group having 4 to 8 carbon atoms and more preferably an alkyl group having 4 to 6 carbon atoms in a case $R^1$ is a hydroxy group and X is an alkylene group having 2 or 3 carbon atoms that has no hydroxy group.

From a viewpoint of exhibiting good removability of the support material, $R^2$ is preferably an alkyl group having 2 to 8 carbon atoms and more preferably an alkyl group having 2 to 6 carbon atoms in a case $R^1$ is an acetyl group, X is a $(EO)_{m1}(PO)_{n1}$ group, m1 is an integer from 1 to 4, and n1 is 0.

From a viewpoint of exhibiting good removability of the support material, $R^2$ is preferably a hydrogen atom in a case $R^1$ is a benzyl group or an alkyl group having 4 to 22 carbon atoms, X is a $(EO)_{m1}(PO)_{n1}$ group, m1 is an integer from 1 to 200, and n1 is 0 to 50.

[Formula 2]

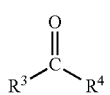

(2)

(In the formula (2), $R^3$ and $R^4$ are same or different; and from a viewpoint of exhibiting good removability of the support material, $R^3$ and $R^4$ represent preferably an alkyl group having 1 to 4 carbon atoms, more preferably an alkyl group having 1 to 3 carbon atoms, and further preferably an alkyl group having 1 or 2 carbon atoms.)

[Formula 3]

$$R^5-OH \qquad (3)$$

(In the formula (3), from a viewpoint of exhibiting good removability of the support material, $R^5$ represents preferably an alkyl group having 1 to 4 carbon atoms, more preferably an alkyl group having 1 to 3 carbon atoms, and further preferably an alkyl group having 2 or 3 carbon atoms.)

[Formula 4]

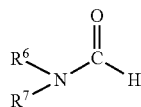

(4)

(In the formula (4), $R^6$ and $R^7$ are same or different; and from a viewpoint of exhibiting good removability of the support material, $R^6$ and $R^7$ represent preferably a hydrogen atom or an alkyl group having 1 to 4 carbon atoms, more preferably an alkyl group having 1 to 3 carbon atoms, and further preferably an alkyl group having 1 or 2 carbon atoms.)

From a viewpoint of exhibiting good removability of the support material, the content of the water-soluble compound in the composition of the treating agent is preferably 1% by mass or more, more preferably 2% by mass or more, and further preferably 3% by mass or more; and from the viewpoints of suppressing the damage to the modeling material and exhibiting good removability of the support material, the content of the water-soluble compound in the composition of the treating agent is preferably 80% by mass or less, more preferably 60% by mass or less, and further preferably 40% by mass or less.

[Water]

Examples of the water include ultrapure water, pure water, deionized water, distilled water, and normal tap water. The content of the water may be a remaining portion of the composition of the treating agent (the total content of the composition of the treating agent being 100% by mass). From a viewpoint of exhibiting good removability of the support material, the content of the water in the composition of the treating agent is preferably 20% by mass or more, more preferably 40% by mass or more, further preferably 60% by mass or more, further more preferably 70% by mass or more, and especially preferably 75% by mass or more. From a viewpoint of exhibiting good removability of the support material, the content of the water in the composition of the agent for treating the precursor of the three-dimensional object is preferably 99% by mass or less, more preferably 98% by mass or less, further preferably 97% by mass or less, further more preferably 95% by mass or less, further more preferably 93% by mass or less, further more preferably 90% by mass or less, and especially preferably 85% by mass or less.

[Others]

The composition of the treating agent may contain a thickener, a pH adjusting agent, a preservative, a rust preventive agent, a pigment, a coloring agent, etc. as necessary in a range without impairing the effects of the present embodiment.

<Method for Manufacturing Three-Dimensional Object>

The method for manufacturing the three-dimensional object according to the present embodiment is a method for manufacturing the three-dimensional object comprising a modeling step of obtaining a precursor of the three-dimensional object containing the three-dimensional object and a support material by a fused deposition modeling system; and a support material removing step of contacting the precursor of the three-dimensional object to the composition of the agent for treating the precursor of the three-dimensional object to remove the support material. According to the method for manufacturing the three-dimensional object of the present embodiment, the support material can be removed more quickly than in the past. It is considered that the reasons for the method for manufacturing the three-dimensional object to have such effects are the same reasons for the composition of the agent for treating the precursor of the three-dimensional object to have the above-described effects.

[Modeling Step]

A step of obtaining the precursor of the three-dimensional object containing the three-dimensional object and a support material in the method for manufacturing the three-dimensional object by a 3D printer of a conventional fused deposition modeling system can be used as the modeling step of obtaining the precursor of the three-dimensional object containing a three-dimensional object and a support material.

The modeling material that is a material of the three-dimensional object is not particularly limited as long as the modeling material is a resin that can be used as a modeling material in the method for manufacturing a three-dimensional object of a conventional FDM system. Examples of the modeling material include thermoplastic resins such as an ABS resin, a polylactate resin, a polycarbonate resin, 12-nylon, 6,6-nylon, 6-nylon, a polyphenylsulfone resin, polyetheretherketone, and polyetherimide. Among these, from a viewpoint of the modeling property by a 3D printer, an ABS resin and/or a polylactate resin are more preferable, and an ABS resin is further preferable. As the 3D printer becomes popularized in a broader range of the fields such as construction, medicine, education, and advanced technology mainly in a manufacturing industry, a material having higher heat resistance, a so-called engineering plastic, may be used as a modeling material.

The modeling material having a high heat resistance generally has a high melting point. However, if the temperature when heat-melting, extruding, and laminating the modeling material by a 3D printer is remarkably different from the temperature of the support material contacting the modeling material, the modeling accuracy of a three-dimensional object may be deteriorated. Therefore, the soluble material for three-dimensional modeling that is a material of the support material is heat-melted, extruded, and laminated at a temperature that is close to the temperature of the modeling material when the modeling material with a high melting point is heat-melted, extruded, and laminated by a 3D printer. In this case, the soluble material for three-dimensional modeling, that is a material of the support material that can be removed by neutral water with pH of 6 to 8 that is not a strong alkaline aqueous solution, is also desirably to have a high melting point. The support material obtained by heat-melting, extruding, and laminating the soluble material for three-dimensional modeling having a high melting point may have poor dissolubility to neutral water and it may be difficult to quickly remove the support material from the precursor of the three-dimensional object.

However, the support material having a high melting point can be quickly removed according to the method for manufacturing the three-dimensional object using the composition of the agent for treating the precursor of the three-dimensional object.

The soluble material for three-dimensional modeling that is a raw material of the support material is not particularly limited as long as it can be used as a soluble material for three-dimensional modeling in the method for manufacturing a three-dimensional object of a conventional FDM system. However, when the support material is removed by neutral water, from a viewpoint of removing the support material quickly, the soluble material for three-dimensional modeling preferably contains a resin having a hydrophilic group. The resin that can be used as a soluble material for three-dimensional modeling in the method of manufacturing a three-dimensional object of a conventional FDM system and having a hydrophilic group is preferably at least one type selected from the group consisting of polyvinyl alcohol, polyoxazoline, polyacrylamide, an acrylate copolymer, a methacrylate (co)polymer, a polyester resin, and a polyamide resin; and more preferably at least one type selected from the group consisting of a polyester resin having a hydrophilic group and a polyamide group having a hydrophilic group.

[Polyester Resin Having Hydrophilic Group]

An example of the polyester resin is a polyester resin having a hydrophilic monomer unit $A_1$ having a hydrophilic group, a hydrophobic dicarboxylic acid monomer unit $B_1$, and a diol monomer unit; in which a ratio of the hydrophilic monomer unit $A_1$ to a total amount of the hydrophilic monomer unit $A_1$ having a hydrophilic group and the hydrophobic dicarboxylic acid monomer unit $B_1$ in the polyester resin is 10 mol % to 70 mol %.

(Hydrophilic Monomer Unit $A_1$)

The polyester resin has a hydrophilic monomer unit $A_1$ having a hydrophilic group. The hydrophilic monomer unit $A_1$ is not particularly limited as long as it is a monomer unit having a hydrophilic group. A monomer for deriving the hydrophilic monomer unit $A_1$ is also referred to as a monomer $A_1$.

From a viewpoint of the solubility into neutral water and a viewpoint of the easiness of the polymerization when producing the polyester resin, examples of the hydrophilic group are at least one type selected from the group consisting of a primary amino group, a secondary amino group, a tertiary amino group, a quaternary ammonium salt group, an oxyethylene group, a hydroxyl group, a carboxyl group, a carboxyl salt group, a phosphoric acid group, a phosphate group, a sulfonic acid group, and a sulfonate group.

From a viewpoint of the solubility into neutral water and a viewpoint of the easiness of the polymerization when producing the polyester resin, the secondary amino group is preferably at least one type selected from the group consisting of a secondary amino group represented by —NHR$^8$ (R$^8$ represents a straight chain or branched alkyl group having 1 to 14 carbon atoms) and a secondary amino group represented by —NH—.

From a viewpoint of the solubility into neutral water and a viewpoint of the easiness of the polymerization when producing the polyester resin, the tertiary amino group is preferably at least one type selected from the group consisting of a tertiary amino group represented by —NR$^9$R$^{10}$ (R$^9$ represents a straight chain or branched alkyl group having 1 to 14 carbon atoms and represents a straight chain or branched alkyl group having 1 to 14 carbon atoms) and a tertiary amino group represented by —NR$^{11}$— (R$^{11}$ represents a straight chain or branched alkyl group having 1 to 14 carbon atoms).

From a viewpoint of the solubility into neutral water and a viewpoint of the easiness of the polymerization when producing the polyester resin, the quaternary ammonium salt group is preferably at least one type selected from the group consisting of a quaternary ammonium salt group represented by —N$^+${R$^{12}$R$^{13}$R$^{14}$}.X$^-$ (Each of R$^{12}$, R$^{13}$, and R$^{14}$ represents a hydrogen atom or an alkyl group having 1 to 14 carbon atoms and X$^-$ represents a hydroxy ion, a halogen ion, CH$_3$SO$_4^-$, or CH$_3$CH$_2$SO$_4^-$).

From a viewpoint of the solubility into neutral water and a viewpoint of the easiness of the polymerization when producing the polyester resin, the oxyethylene group is preferably at least one type selected from the group consisting of an oxyethylene group represented by —{CH$_2$CH$_2$O}$_{n2}$— (n2 represents an average number and it is an integer of 1 to 2,500, preferably 2 to 1,000, more preferably 3 to 100, and further preferably 4 to 50) and an oxyethylene group represented by —{CH$_2$CH$_2$O}$_{m2}$—R$^{15}$ (m2 represents an average number and it is an integer of 1 to 2,500, preferably 2 to 1,000, more preferably 3 to 100, and further preferably 4 to 50. R$^{15}$ represents a hydrogen atom or a straight chain or branched alkyl group having 1 to 10 carbon atoms and it is more preferably 2 to 6 and further preferably 3 to 5).

From a viewpoint of the solubility into neutral water and a viewpoint of the easiness of the polymerization when producing the polyester resin, the carboxyl salt group is preferably a carboxyl salt group represented by —COOM$^1$ (M$^1$ represents a counterion of a carboxyl group constituting the carboxyl salt group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyester resin, the phosphate group is preferably at least one type selected from the group consisting of a phosphate group represented by —PO$_4$M$^2_2$, —PO$_4$HM$^2$, and —PO$_4$M$^2$ (M$^2$ represents a counterion of a phosphoric acid group constituting the phosphate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyester resin, the sulfonate group is preferably a sulfonate group represented by —SO$_3$M$^3$ (M$^3$ represents a counterion of a sulfonic acid group constituting the sulfonate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water, a viewpoint of moisture absorption resistance, a viewpoint of heat resistance required for modeling by a 3D printer, and a viewpoint of the easiness of the polymerization when producing the polyester resin, the monomer $A_1$ is preferably at least one type selected from the group consisting of carboxylic acid, amine, and amino acid, and more preferably carboxylic acid. Among the type of carboxylic acid, from the same viewpoints, aromatic carboxylic acid is preferable; and at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid are more preferable. Among those, from the same viewpoints, at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid are preferable; at least one type selected from the group consisting of 5-sulfoisophthalic acid and 2-sulfoterephthalic acid are more preferable; and 5-sulfoisophthalic acid is further preferable.

From a viewpoint of the solubility into neutral water, the content of the hydrophilic group in the polyester resin is preferably 0.5 mmol/g or more, more preferably 0.6 mmol/g or more, and further preferably 0.7 mmol/g or more; and from a viewpoint of moisture absorption resistance, it is preferably 3.0 mmol/g or less, more preferably 2.0 mmol/g or less, and further preferably 1.5 mmol/g or less. From the viewpoint of the solubility into neutral water and the viewpoint of moisture absorption resistance, the content of the hydrophilic group in the polyester resin is preferably 0.5 mmol/g to 3.0 mmol/g, more preferably 0.6 mmol/g to 2.0 mmol/g, and further preferably 0.7 mmol/g to 1.5 mmol/g.

From a viewpoint of the solubility into neutral water, the ratio of the amount of the hydrophilic monomer unit $A_1$ to the total amount of monomer units in the polyester resin is 5 mol % or more, preferably 7 mol % or more, more preferably 10 mol % or more, and further preferably 12 mol % or more; and from a viewpoint of moisture absorption resistance, it is 35 mol % or less, preferably 33 mol % or less, more preferably 32 mol % or less, and further preferably 30 mol % or less. From the viewpoint of the solubility into neutral water and from the viewpoint of moisture absorption resistance, the ratio of the amount of the hydrophilic monomer unit $A_1$ to the total amount of monomer units in the polyester resin is preferably 5 mol % to 35 mol %, more preferably 7 mol % to 33 mol %, further preferably 10 mol % to 32 mol %, and further more preferably 12 mol % to 30 mol %.

[Hydrophobic Dicarboxylic Acid Monomer Unit $B_1$]

The polyester resin has a hydrophobic dicarboxylic acid monomer unit $B_1$. The dicarboxylic acid monomer unit $B_1$ does not have a hydrophilic group. In the present specification, dicarboxylic acid for deriving the hydrophobic dicarboxylic acid monomer unit $B_1$ is also referred to as dicarboxylic acid $B_1$.

The dicarboxylic acid $B_1$ is not particularly limited as long as it is dicarboxylic acid. However, from a viewpoint of the solubility into neutral water, a viewpoint of moisture absorption resistance, a viewpoint of heat resistance required for modeling by a 3D printer, and a viewpoint of the easiness of the polymerization when producing the polyester resin, the dicarboxylic acid $B_1$ is preferably at least one type selected from the group consisting of aromatic dicarboxylic acid, aliphatic dicarboxylic acid, and alicyclic dicarboxylic acid. Among these, from the same viewpoints, at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid are more preferable; and at least one type selected from the group consisting of terephthalic acid, 2,5-furan dicarboxylic acid, and 2,6-naphthalene dicarboxylic acid are further preferable.

From a viewpoint of moisture absorption resistance, the ratio of the amount of the hydrophobic dicarboxylic acid monomer unit $B_1$ in the polyester resin to the total amount of monomer units in the polyester resin is preferably 15 mol % or more, more preferably 18 mol % or more, and further preferably 20 mol % or more; and from a viewpoint of the solubility into neutral water, it is preferably 45 mol % or less, more preferably 42 mol % or less, and further preferably 40 mol % or less. From the viewpoint of moisture absorption resistance and the viewpoint of the solubility into neutral water, the ratio of the amount of the hydrophobic dicarboxylic acid monomer unit $B_1$ in the polyester resin to the total amount of monomer units in the polyester resin is preferably 15 mol % to 45 mol %, more preferably 20 mol % to 42 mol %, and further preferably 30 mol % to 40 mol %.

From the viewpoints of the solubility into neutral water, moisture absorption resistance, and heat resistance required for modeling by a 3D printer, the mole ratio of the hydrophilic monomer unit $A_1$ to the hydrophobic dicarboxylic acid monomer unit $B_1$ (hydrophilic monomer unit $A_1$/hydrophobic dicarboxylic acid monomer unit $B_1$) is preferably 10/90 or more, more preferably 15/85 or more, further preferably 18/82 or more, and further more preferably 20/80 or more; and from the same viewpoints, it is preferably 70/30 or less, more preferably 65/35 or less, and further preferably 60/40 or less.

[Diol Monomer Unit]

The polyester resin has a diol monomer unit. The diol for deriving the diol monomer unit is also referred to as diol C.

The diol C is not particularly limited, and aliphatic diol, aromatic diol, etc. can be used. However, from a viewpoint of the production cost of the polyester resin, the diol C is preferably aliphatic diol.

From the viewpoints of the solubility into neutral water, moisture absorption resistance, and heat resistance required for modeling by a 3D printer, the number of carbon atoms in the diol C is preferably 2 or more; and from the same viewpoints, it is preferably 31 or less, more preferably 25 or less, further preferably 20 or less, and further more preferably 15 or less.

An example of the aliphatic dial is at least one type selected from the group consisting of chain diol and cyclic diol. From the viewpoints of the solubility into neutral water, moisture absorption resistance, and toughness (strength) required for modeling by a 3D printer, chain diol is preferable.

From the viewpoints of the solubility into neutral water, moisture absorption resistance, and heat resistance required for modeling by a 3D printer, the number of carbon atoms in the chain diol is preferably 2 or more; and from the same viewpoints, it is preferably 6 or less, more preferably 4 or less, and further preferably 3 or less.

From the viewpoints of the solubility into neutral water, moisture absorption resistance, and heat resistance required for modeling by a 3D printer, the number of carbon atoms in the cyclic diol is preferably 6 or more; and from the same viewpoints, it is preferably 31 or less, more preferably 30 or less, and further preferably 27 or less.

The diol C may have ether enzyme. However, if the diol C is a chain aliphatic diol, from the viewpoints of the solubility into neutral water, moisture absorption resistance, and heat resistance required for modeling by a 3D printer, the number of the ether enzyme is preferably 1 or less; and if the diol C is a cyclic aliphatic diol, from the same viewpoints, the number of the ether enzyme is preferably 2 or less.

From the viewpoints of the solubility into neutral water, moisture absorption resistance, and heat resistance required for modeling by a 3D printer, the chain diol is preferably at least one type selected from the group consisting of ethylene glycol, 1,2-propanediol, 1,3-propanediol, diethylene glycol, and dipropylene glycol; and more preferably at least one type selected from the group consisting of ethylene glycol, 1,2-propaneediol, and 1,3-propanediol. Among these, diethylene glycol and dipropylene glycol may be prepared as a raw material for polymerization or may be generated during the polymerization.

If the diol C contains diethylene glycol, from the viewpoints of the solubility into neutral water, moisture absorption resistance, and heat resistance required for modeling by a 3D printer, the ratio of diethylene glycol to the total amount of all diol monomer units in the polyester resin is preferably 5 mol % or more, more preferably 10 mol % or more, further preferably 15 mol % or more, furthermore preferably 20 mol % or more, especially preferably 25 mol % or more, more especially preferably 30 mol % or more; and preferably 60 mol % or less, more preferably 55 mol % or less, further preferably 50 mol % or less, and further preferably 45 mol % or less.

From the viewpoints of the solubility into neutral water, moisture absorption resistance, and heat resistance required for modeling by a 3D printer, the cyclic diol is preferably at least one type selected from the group consisting of 1,4-cyclohexane dimethanol, hydrogenated bisphenol A, isosorbide, bisphenoxyethanolfluorene, bisphenolfluorene, biscresoxyethanolfluorene, and biscresolfluorene.

If the diol C is at least one type selected from the group consisting of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorenem and biscresolfluorene; from the viewpoints of the solubility into neutral water, moisture absorption resistance, and heat resistance required for modeling by a 3D printer; the ratio of the total amount of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene and biscresolfluorene to the total amount of all diol monomer units in the polyester resin is preferably 80 mol % or more, more preferably 90 mol % or more, further preferably 95 mol % or more, furthermore preferably 98 mol % or more, especially preferably substantially 100 mol %, and more especially preferably 100 mol %.

The polyester resin is preferably the following resin from the viewpoints of the solubility into neutral water, moisture absorption resistance, and heat resistance required for modeling by a 3D printer: a polyester resin α in which the ratio of the hydrophilic monomer unit $A_1$ in the total of all dicarboxylic acid monomer units, which include the hydrophilic monomer unit $A_1$, is 10 mol % to 70 mol %; the ratio of the dicarboxylic acid monomer units $B_1$ in the same total is 30 mol % to 90 mol %; and the dicarboxylic acid $B_1$ for obtaining the dicarboxylic acid monomer units $B_1$ is 2,6-naphthalene dicarboxylic acid.

(Polyester Resin α)

From the viewpoints of the solubility into neutral water, moisture absorption resistance, and heat resistance required for modeling by a 3D printer; the ratio of the hydrophilic monomer unit $A_1$ to the total amount of all dicarboxylic acid monomer units including the hydrophilic monomer unit $A_1$ in the polyester resin α is preferably 10 mol % or more and more preferably 20 mol % or more; and from the same viewpoints, it is preferably 70 mol % or less, more preferably 65 mol % or less, and further preferably 60 mol % or less.

From the viewpoints of the solubility into neutral water, moisture absorption resistance, and heat resistance required for modeling by a 3D printer; the ratio of the dicarboxylic acid monomer unit $B_1$ to the total amount of all dicarboxylic acid monomer units including the hydrophilic monomer unit $A_1$ in the polyester resin α is preferably 30 mol % or more, more preferably 35 mol % or more, and further preferably 40 mol % or more; and from the same viewpoints, it is preferably 90 mol % or less and more preferably 80 mol % or less.

From the viewpoints of the solubility into neutral water, moisture absorption resistance, and heat resistance required for modeling by a 3D printer; the monomer $A_1$ in the polyester resin a is at least one type selected from the group consisting of 5-sulfoisophthalic acid and 2-sulfoisophthalic acid and more preferably 5-sulfoisophthalic acid.

From the viewpoints of the solubility into neutral water, moisture absorption resistance, and heat resistance required for modeling by a 3D printer, the diol C in the polyester resin α is preferably at least one type selected from the group consisting of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene, and biscresolfluorene; and more preferably at least one type selected from the group consisting of ethylene glycol, diethylene glycol, 1,4-cyclohexane dimethanol, hydrogenated bisphenol A, isosorbide, and bisphenoxyethanolfluorene.

Examples of the polyester resin a can be shown by the following formulas (5) and (6).

[Formula 5]

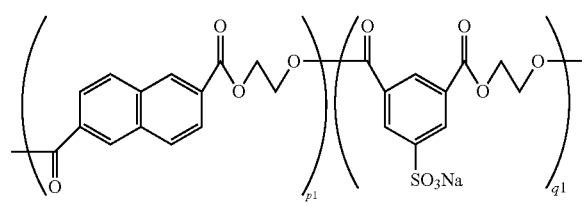

(5)

(In the formula (5), p1 represents the number-average degree of polymerization of ethylene 2,6-naphthalene dicarboxylate, and q1 represents the number-average degree of polymerization of ethylene 5-sulfoisophthalate. However, ethylene 2,6-naphthalene dicarboxylate and ethylene 5-sulfoisophthalate are a block copolymer and/or a random copolymer; and from a viewpoint of the solubility into neutral water, they preferably are a random copolymer.)

[Formula 6]

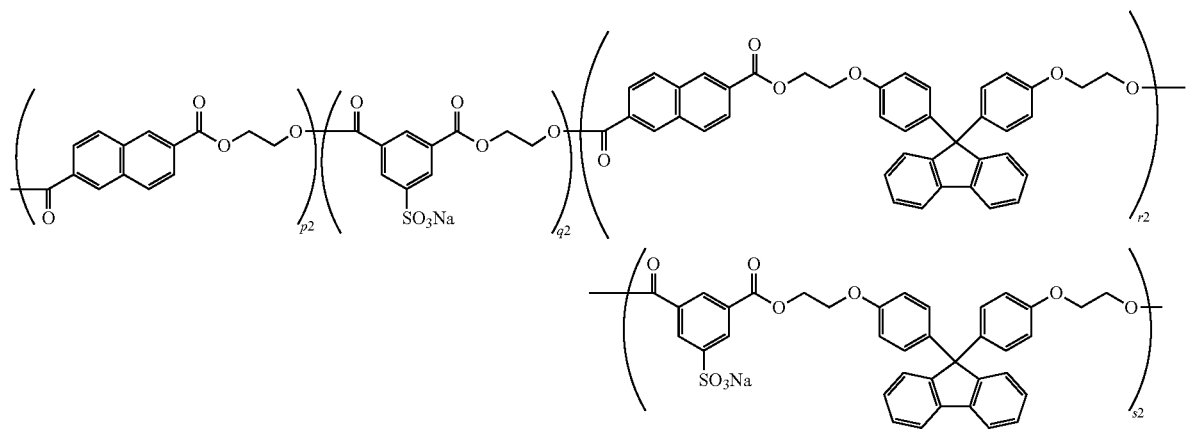

(6)

(In the formula (6), p2 represents the number-average degree of polymerization of ethylene 2,6-naphthalene dicarboxylate, q2 represents the number-average degree of polymerization of ethylene 5-sulfoisophthalate, r2 represents the number-average degree of polymerization of a condensate of bisphenoxyethanolfluorene and 2,6-naphthalene dicarboxylate, and s2 represents the number-average degree of polymerization of a condensate of bisphenoxyethanolfluorene and 5-sulfoisophthalate. However, ethylene 2,6-naphthalene dicarboxylate, ethylene 5-sulfoisophthalate, a condensate of bisphenoxyethanolfluorene and 2,6-naphthalene dicarboxylate, and a condensate of bisphenoxyethanolfluorene and 5-sulfoisophthalate are polymerized to form a block copolymer and/or a random copolymer; and from a viewpoint of the solubility into neutral water, they are polymerized to form a random copolymer.)

From a viewpoint of improving the toughness required for the soluble material for three-dimensional modeling, the weight average molecular weight of the polyester resin is preferably 3,000 or more, more preferably 8,000 or more, further preferably 10,000 or more; from a viewpoint of the modeling property by a 3D printer, the weight average molecular weight of the polyester resin is preferably 80,000 or less, more preferably 70,000 or less, further preferably 60,000 or less, furthermore preferably 50,000 or less; and from a viewpoint of the solubility into neutral water, the weight average molecular weight of the polyester resin is preferably 60,000 or less, more preferably 50,000 or less, and further preferably 40,000 or less. In the present specification, the weight average molecular weight is obtained with a method described in the example.

The polyester resin may have monomer unit other than the hydrophilic monomer unit $A_1$, the dicarboxylic acid monomer unit and diol monomer unit as long as the effect of the present embodiment is not impaired.

The method for manufacturing the polyester resin is not particularly limited and a conventionally known method for manufacturing a polyester resin can be applied.

[Polyamide Resin having Hydrophilic Group]

An example of the polyamide resin is a polyamide resin having a hydrophilic monomer unit $A_2$ having a hydrophilic group, a hydrophobic dicarboxylic acid monomer unit $B_2$, and a hydrophobic diamine monomer unit, in which the ratio of the hydrophilic monomer unit $A_2$ to the total amount of all monomer units in the polyamide resin is 2.5 mol % to 40 mol %.

(Hydrophilic Monomer Unit $A_2$)

The polyamide resin has a hydrophilic monomer unit $A_2$ having a hydrophilic group. The hydrophilic monomer unit $A_2$ is not particularly limited as long as it is a monomer unit having a hydrophilic group. A monomer for deriving the hydrophilic monomer unit $A_2$ is also referred to as a monomer $A_2$.

From a viewpoint of the solubility into neutral water and a viewpoint of the easiness of the polymerization when producing the polyamide resin, examples of the hydrophilic group are at least one type selected from the group consisting of a primary amino group, a secondary amino group, a tertiary amino group, a quaternary ammonium salt group, an oxyethylene group, a hydroxyl group, a carboxyl group, a carboxyl salt group, a phosphoric acid group, a phosphate group, a sulfonic acid group, and a sulfonate group.

From a viewpoint of the solubility into neutral water and a viewpoint of the easiness of the polymerization when producing the polyamide resin, the secondary amino group is preferably at least one type selected from the group consisting of a secondary amino group represented by —NHR$^{16}$ (R$^{16}$ represents a straight chain or branched alkyl group having 1 to 14 carbon atoms) and a secondary amino group represented by —NH—.

From a viewpoint of the solubility into neutral water and a viewpoint of the easiness of the polymerization when producing the polyamide resin, the tertiary amino group is preferably at least one type selected from the group consisting of a tertiary amino group represented by —NR$^{17}$R$^{18}$ (R$^{17}$ represents a straight chain or branched alkyl group having 1 to 14 carbon atoms and R$^{18}$ represents a straight chain or branched alkyl group having 1 to 14 carbon atoms)

and a tertiary amino group represented by —$NR^{19}$— ($R^{19}$ represents a straight chain or branched alkyl group having 1 to 14 carbon atoms).

From a viewpoint of the solubility into neutral water and a viewpoint of the easiness of the polymerization when producing the polyamide resin, the quaternary ammonium salt group is preferably at least one type selected from the group consisting of a quaternary ammonium salt group represented by —$N^+\{R^{20}R^{21}R^{22}\}$. $X^-$ (Each of $R^{20}$, $R^{21}$, and $R^{22}$ represents a hydrogen atom or an alkyl group having 1 to 14 carbon atoms and $X^-$ represents a hydroxy ion, a halogen ion, $CH_3SO_4^-$, or $CH_3CH_2SO_4^-$).

From a viewpoint of the solubility into neutral water and a viewpoint of the easiness of the polymerization when producing the polyamide resin, the oxyethylene group is preferably at least one type selected from the group consisting of an oxyethylene group represented by —$\{CH_2CH_2O\}_{n3}$— (n3 represents an average number and it is an integer of 1 to 2,500, preferably 2 to 1,000, more preferably 3 to 100, and further preferably 4 to 50) and an oxyethylene group represented by —$\{CH_2CH_2O\}_{m3}$—$R^{23}$ (m3 represents an average number and it is an integer of 1 to 2,500, preferably 2 to 1,000, more preferably 3 to 100, and further preferably 4 to 50. $R^{23}$ represents a hydrogen atom or a straight chain or branched alkyl group having 1 to 10 carbon atoms and it is more preferably 2 to 6 and further preferably 3 to 5).

From a viewpoint of the solubility into neutral water and a viewpoint of the easiness of the polymerization when producing the polyamide resin, the carboxyl salt group is preferably a carboxyl salt group represented by —$COOM^4$ ($M^4$ represents a counterion of a carboxyl group constituting the carboxyl salt group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyamide resin, the phosphate group is preferably at least one type selected from the group consisting of a phosphate group represented by —$PO_4M^5_2$, —$PO_4HM^5$, and —$PO_4M^5$ ($M^5$ represents a counterion of a phosphoric acid group constituting the phosphate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water and a viewpoint of the easiness of the polymerization when producing the polyamide resin, the sulfonate group is preferably a sulfonate group represented by —$SO_3M^6$ ($M^6$ represents a counterion of a sulfonic acid group constituting the sulfonate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

From a viewpoint of the solubility into neutral water, a viewpoint of moisture absorption resistance, a viewpoint of heat resistance required for modeling by a 3D printer, and a viewpoint of the easiness of the polymerization when producing the polyamide resin, the monomer $A_2$ is preferably at least one type selected from the group consisting of carboxylic acid, amine, and amino acid, and more preferably carboxylic acid. Among the type of carboxylic acid, from the same viewpoints, aromatic carboxylic acid is preferable; and at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid are more preferable. Among those, from the same viewpoints, at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid are preferable; at least one type selected from the group consisting of 5-sulfoisophthalic acid and 2-sulfoterephthalic acid are more preferable; and 5-sulfoisophthalic acid is further preferable.

From a viewpoint of the solubility into neutral water, the content of the hydrophilic group in the polyamide resin is preferably 0.5 mmol/g or more, more preferably 0.6 mmol/g or more, and further preferably 0.7 mmol/g or more; and from a viewpoint of moisture absorption resistance, it is preferably 3.0 mmol/g or less, more preferably 2.0 mmol/g or less, and further preferably 1.5 mmol/g or less. From the viewpoint of the solubility into neutral water and the viewpoint of moisture absorption resistance, the content of the hydrophilic group in the polyamide resin is preferably 0.5 mmol/g to 3.0 mmol/g, more preferably 0.6 mmol/g to 2.0 mmol/g, and further preferably 0.7 mmol/g to 1.5 mmol/g.

From a viewpoint of the solubility into neutral water, the ratio of the amount of the hydrophilic monomer unit $A_2$ to the total amount of monomer units in the polyamide resin is 2.5 mol % or more, preferably 4 mol % or more, more preferably 6 mol % or more, further preferably 8 mol % or more, and further more preferably 10 mol % or more; and from a viewpoint of moisture absorption resistance, it is 40 mol % or less, preferably 35 mol % or less, more preferably 31 mol % or less, further preferably 25 mol % or less, further more preferably 20 mol % or less, especially preferably 15 mol % or less, more especially preferably 10 mol % or less, and more especially preferably 8 mol % or less. From the viewpoint of the solubility into neutral water and from the viewpoint of moisture absorption resistance, the ratio of the amount of the hydrophilic monomer unit $A_2$ to the total amount of monomer units in the polyamide resin is preferably 2.5 mol % to 40 mol %, more preferably 4 mol % to 35 mol %, further preferably 6 mol % to 31 mol %, further more preferably 8 mol % to 20 mol %, especially preferably 8 mol % to 15 mol %, and more especially preferably 8 mol % to 12 mol %.

[Hydrophobic Dicarboxylic Acid Monomer Unit $B_2$]

The polyamide resin has a hydrophobic dicarboxylic acid monomer unit $B_2$. The dicarboxylic acid monomer unit $B_2$ does not have a hydrophilic group. In the present specification, dicarboxylic acid for deriving the hydrophobic dicarboxylic acid monomer unit $B_2$ is also referred to as dicarboxylic acid $B_2$.

The dicarboxylic acid $B_2$ is not particularly limited as long as it is dicarboxylic acid. However, from a viewpoint of the solubility into neutral water, a viewpoint of moisture absorption resistance, a viewpoint of heat resistance required for modeling by a 3D printer, and a viewpoint of the easiness of the polymerization when producing the polyamide resin, the dicarboxylic acid $B_2$ is preferably at least one type selected from the group consisting of aromatic dicarboxylic acid, aliphatic dicarboxylic acid, and alicyclic dicarboxylic acid. Among these, from the same viewpoints, at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid are more preferable; and at least one type selected from the group consisting of terephthalic acid, 2,5-furan dicarboxylic acid, and 2,6-naphthalene dicarboxylic acid are further preferable; terephthalic acid is further more preferable.

From a viewpoint of moisture absorption resistance, the ratio of the amount of the hydrophobic dicarboxylic acid monomer unit $B_2$ in the polyamide resin to the total amount of monomer units in the polyamide resin is preferably 10 mol % or more, more preferably 20 mol % or more, further preferably 30 mol % or more, furthermore preferably 35 mol % or more, especially preferably 40 mol % or more, and more especially preferably 42 mol % or more; and from a viewpoint of the solubility into neutral water, it is preferably 47.5 mol % or less, more preferably 45 mol % or less, further preferably 42 mol % or less, and furthermore preferably 40 mol % or less. From the viewpoint of moisture absorption resistance and the viewpoint of the solubility into neutral water, the ratio of the amount of the hydrophobic dicarboxylic acid monomer unit $B_2$ in the polyamide resin to the total amount of monomer units in the polyamide resin is preferably 10 mol % to 47.5 mol %, more preferably 20 mol % to 45 mol %, and further preferably 30 mol % to 42 mol %.

From the viewpoints of the solubility into neutral water, moisture absorption resistance, and heat resistance required for modeling by a 3D printer, the mole ratio of the hydrophilic monomer unit $A_2$ to the hydrophobic dicarboxylic acid monomer unit $B_2$ (hydrophilic monomer unit $A_2$/hydrophobic dicarboxylic acid monomer unit $B_2$) is preferably 10/90 or more, more preferably 15/85 or more, further preferably 18/82 or more, and further more preferably 20/80 or more; and from the same viewpoints, it is preferably 50/50 or less, more preferably 40/60 or less, further preferably 30/70 or less, and further more preferably 25/75 or less.

[Hydrophobic Diamine Monomer Unit]

The polyamide resin has a hydrophobic diamine monomer unit. The hydrophobic diamine monomer unit does not have a hydrophilic group. The diamine for deriving the hydrophobic diamine monomer unit is also referred to as diamine C.

The diamine C is not particularly limited, and at least one type selected from the group consisting of aliphatic diamine, alicyclic diamine, and aromatic diamine can be used. However, from a viewpoint of the easiness of the polymerization when producing the polyamide resin, the diamine C is preferably aliphatic diamine.

From the viewpoints of the solubility into neutral water, moisture absorption resistance, heat resistance required for modeling by a 3D printer, and easiness of the polymerization when producing the polyamide resin, the number of carbon atoms in the diamine C is preferably 2 or more, more preferably 3 or more, and further preferably 4 or more; and from the viewpoints of the solubility into neutral water, moisture absorption resistance, and heat resistance required for modeling by a 3D printer, it is preferably 20 or less, more preferably 15 or less, and further preferably 10 or less.

Examples of the aliphatic diamine include ethylenediamine, trimethylenediamine, tetramethylenediamine, pentamethylenediamine, hexamethylenediamine, heptamethylenediamine, octamethylenediamine, nonanediamine, and decanediamine. Among these, from the viewpoints of the solubility into neutral water, moisture absorption resistance, and toughness (strength) required for modeling by a 3D printer, hexamethylenediamine is preferable.

Examples of the alicyclic diamine include 4,4'-diamino-3,3'-dimethyldicyclohexylmethane, diamine cyclohexane, and isophoronediamine. Among these, from the viewpoints of the solubility into neutral water, moisture absorption resistance, and toughness (strength) required for modeling by a 3D printer, at least one type selected from the group consisting of diaminecyclohexane and isophoronediamine is preferable and at least one type selected from the group consisting of diaminecyclohexane is more preferable.

Examples of the aromatic diamine include phenylene diamine, diethyltoluenediamine, and 4,4'-diaminophenylmethane. Among these, from the viewpoints of the solubility into neutral water, moisture absorption resistance, and toughness (strength) required for modeling by a 3D printer, at least one type selected from the group consisting of phenylene diamine and diethyltoluenediamine is preferable and at least one type selected from the group consisting of phenylenediamine is more preferable.

From the viewpoints of the solubility into neutral water, moisture absorption resistance, and toughness (strength) required for modeling by a 3D printer, the diamine C is preferably at least one type selected from the group consisting of hexamethylenediamine, diaminecyclohexane, and phenylenediamine, more preferably at least one type selected from the group consisting of hexamethylenediamine and phenylenediamine, and further preferably hexamethylene diamine.

If the diamine C is at least one type selected from the group consisting of hexamethylenediamine, diaminecyclohexane, and phenylenediamine; from the viewpoints of the solubility into neutral water, moisture absorption resistance, and heat resistance required for modeling by a 3D printer; the ratio of the total amount of hexamethylenediamine, diaminecyclohexane, and phenylenediamine to the total amount of all diamine monomer units in the polyamide resin is preferably 50 mol % or more, more preferably 70 mol % or more, further preferably 80 mol % or more, further more preferably 90 mol % or more, especially preferably substantially 100 mol %, and more especially preferably 100 mol %. "Substantially 100 mol %" means that a case is included in which substances other than hexamethylenediamine, diaminecyclohexane, and phenylenediamine are inevitably mixed in the diamine C.

Examples of the polyamide resin can be shown in the following formulas (7) to (12).

[Formula 7]

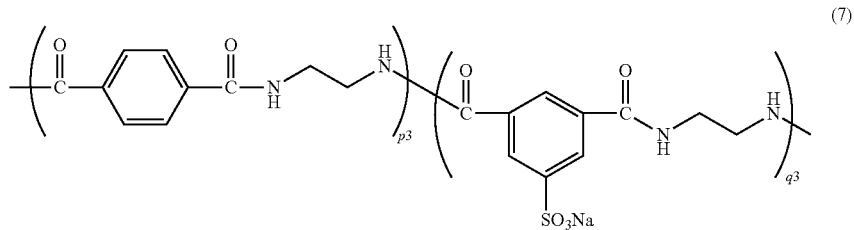

(7)

(In the formula (7), p3 and q3 represent the number-average degree of polymerization respectively. The polymer may be a block copolymer or a random copolymer; and from a viewpoint of the solubility into neutral water, the polymer is preferably a random copolymer.)

[Formula 8]

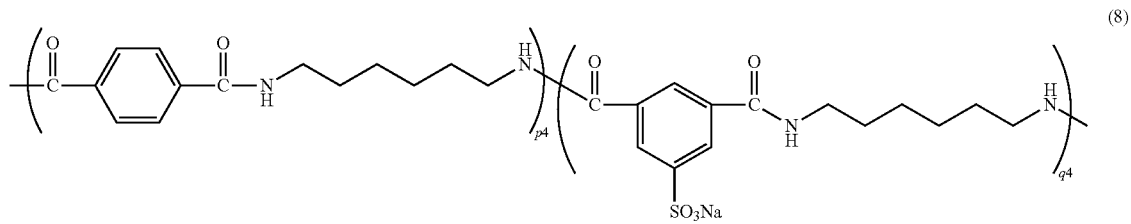

(8)

(In the formula (8), p4 and q4 represent the number-average degree of polymerization respectively. The polymer may be a block copolymer or a random copolymer; and from a viewpoint of the solubility into neutral water, the polymer is preferably a random copolymer.)

[Formula 9]

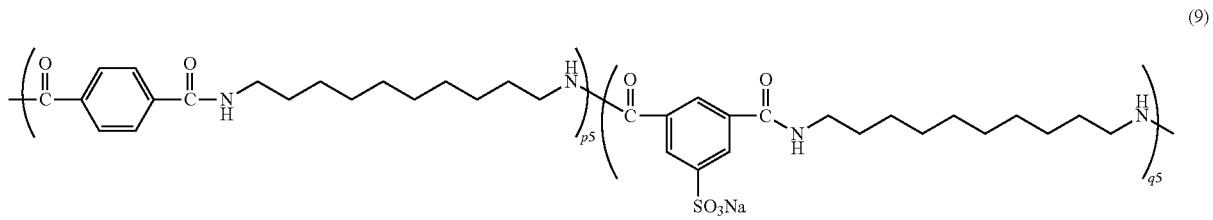

(9)

(In the formula (9), p5 and q5 represent the number-average degree of polymerization respectively. The polymer may be a block copolymer or a random copolymer; and from a viewpoint of the solubility into neutral water, the polymer is preferably a random copolymer.)

[Formula 10]

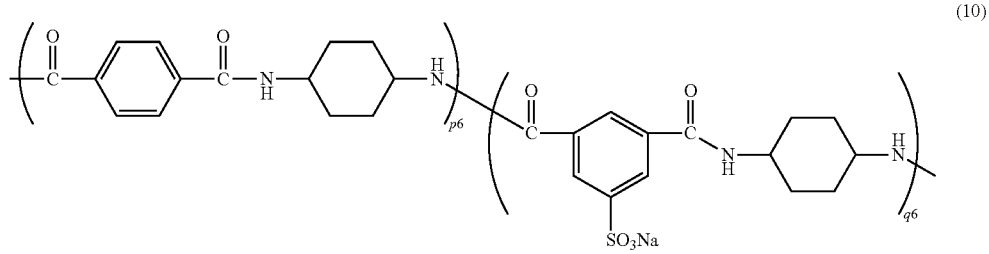

(10)

(In the formula (10), p6 and q6 represent the number-average degree of polymerization respectively. The polymer may be a block copolymer or a random copolymer; and from a viewpoint of the solubility into neutral water, the polymer is preferably a random copolymer.)

[Formula 11]

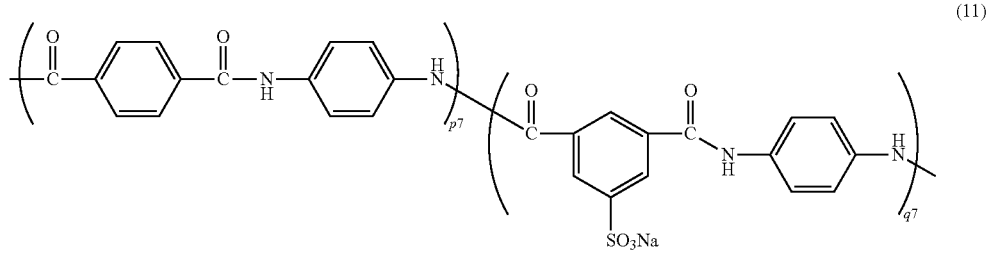

(11)

(In the formula (11), p7 and q7 represent the number-average degree of polymerization respectively. The polymer may be a block copolymer or a random copolymer; and from a viewpoint of the solubility into neutral water, the polymer is preferably a random copolymer.)

[Formula 12]

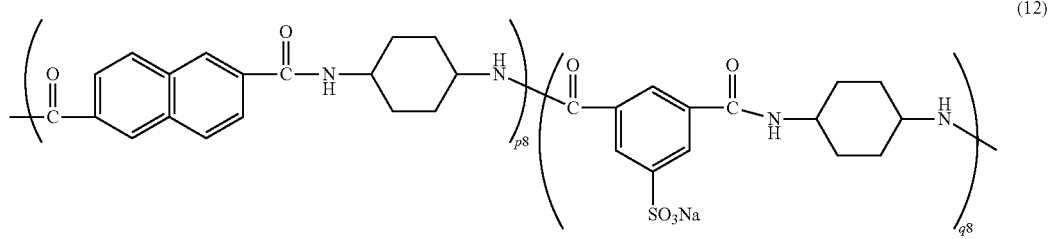

(12)

(In the formula (12), p8 and q8 represent the number-average degree of polymerization respectively. The polymer may be a block copolymer or a random copolymer; and from a viewpoint of the solubility into neutral water, the polymer is preferably a random copolymer.)

From a viewpoint of improving the toughness required for a soluble material for three-dimensional modeling, the weight average molecular weight of the polyamide resin is preferably 3,000 or more, more preferably 3,500 or more, further preferably 4,000 or more; and from the viewpoints of solubility into neutral water and the modeling property by a 3D printer, the weight average molecular weight of the polyamide resin is preferably 70,000 or less, more preferably 50,000 or less, further preferably 30,000 or less, and furthermore preferably 20,000 or less.

The polyamide resin may have monomer unit other than the monomer unit A, the dicarboxylic acid monomer unit B, and diamine monomer unit C as long as the effect of the present embodiment is not impaired.

The method for manufacturing the polyamide resin is not particularly limited and a conventionally known method for manufacturing a polyamide resin can be applied.

From a viewpoint of the modeling property by a 3D printer, the glass transition temperature of the resin having a hydrophilic group is preferably 50° C. or higher, more preferably 60° C. or higher, further preferably 70° C. or higher, and further more preferably 80° C. or higher; and from the same viewpoint, the glass transition temperature of the resin having a hydrophilic group is preferably 250° C. or lower, more preferably 220° C. or lower, and further preferably 200° C. or lower.

The content of the resin having a hydrophilic group in the soluble material for three-dimensional modeling can be adjusted in a range without impairing the effects of the present embodiment. However, from the viewpoints of the solubility into neutral water, the water absorption resistance, and the heat resistance required for modeling by a 3D printer, the content of the resin having a hydrophilic group in the soluble material for three-dimensional modeling is preferably 70% by mass or more, and more preferably 80% by mass or more. However, if the content of the resin having a hydrophilic group in the soluble material for three-dimensional modeling is too high, the toughness (strength) may deteriorate. Therefore, the content of the resin having a hydrophilic group in the soluble material for three-dimensional modeling is preferably 95% by mass or less, and more preferably 90% by mass or less. From a viewpoint of suppressing the deterioration of the toughness (strength) of the soluble material for three-dimensional modeling, the soluble material for three-dimensional modeling preferably contains a compatibilizer or an elastomer. Examples of the compatibilizer include Bondfast® 7B and Bondfast® 7M (manufactured by Sumitomo Chemical Co., Ltd.); LOTADER® AX8840 (manufactured by Arkema Inc.); JONCRYL® ADR4370S, JONCRYL® ADR4368CS, JONCRYL™ ADR4368F, and JONCRYL™ ADR4300S (manufactured by BASF SE); ARUFON® UG4035, ARUFON® UG4040, and ARUFON® UG4070 (manufactured by Toagosei Co., Inc.); UMEX® 1010 (manufactured by Sanyo Chemical Industries, Ltd.); Admer™ (manufactured by Mitsui Chemical, Inc.); MODIPER® A8200 (manufactured by NOF Corporation); OREVAC® (manufactured by Arkema S.A.); FG1901 and FG1924 (manufactured by Kraton Corporation); and Tuftec™ M1911, Tuftec™ M1913, and Tuftec™ M1943 (manufactured by Asahi Kasei Corporation); and CARBODILITE LA-1™ (manufactured by Nisshinbo Chemical Inc.) Examples of the elastomer include KURARITY™ LA2250, KURARITY™ LA2140, KURARITY™ LA4285 (manufactured by Kuraray Co., Ltd.); a Kraton® ERS polymer, a Kraton® A polymer, and a Kraton® G polymer (Manufactured by Kraton Corporation); Tuftec™ H series and Tuftec™ P series (manufactured by Asahi Kasei Corporation); and SEPTON™ and HYBRAR™ (manufactured by Kuraray Co., Ltd.).

From a viewpoint of the modeling property by a 3D printer, the glass transition temperature of the soluble material for three-dimensional modeling is preferably 50° C. or higher, more preferably 60° C. or higher, further preferably 70° C. or higher, and further more preferably 80° C. or higher; and from the same viewpoint, the glass transition temperature of the soluble material for three-dimensional modeling is preferably 250° C. or lower, more preferably 220° C. or lower, and further preferably 200° C. or lower.

The form of the soluble material for three-dimensional modeling is not particularly limited, and examples of the form include a pellet, powder, and a filament. However, from a viewpoint of the modeling property by a 3D printer, a filament is preferable.

From a viewpoint of the modeling property by a 3D printer and a viewpoint of improving the modeling accuracy of a three-dimensional object, the diameter of the filament is preferably 0.5 mm or more, and more preferably 1.0 mm or more; from the same viewpoints, the diameter of the filament is preferably 3.0 mm or less, more preferably 2.0 mm or less, and further preferably 1.8 mm or less. From a viewpoint of enhancing the toughness, a drawing process is preferably performed to produce a filament. From a viewpoint of improving the toughness while maintaining solubility, the draw ratio is preferably 1.5 times or more, more preferably 2 times or more, further preferably 3 times or more, further more preferably 5 times or more; and from the same viewpoint, the draw ratio is preferably 200 times or less, more preferably 150 times or less, further preferably 100 times or less, and further more preferably 50 times or less. The drawing temperature is preferably in a range of a temperature from 20° C. lower than the glass transition temperature of the soluble material for three-dimensional modeling to 110° C. higher than the glass transition temperature. From a viewpoint of improving the toughness and a viewpoint of thermal stability, the lower limit of the drawing temperature is more preferably 10° C. lower than the glass transition temperature, and further preferably same as the glass transition temperature. From the same viewpoints, the upper limit of the drawing temperature is more preferably 110° C. higher than the glass transition temperature, further preferably 100° C. higher than the glass transition temperature, and further more preferably 90° C. higher than the glass transition temperature. The drawing may be performed while air cooling when the resin is discharged from the extruder or the resin may be heated by hot air or a laser. The drawing may be performed in one stage to a prescribed filament diameter at a prescribed draw ratio or multiple stages to a prescribed filament diameter at a prescribed draw ratio.

The soluble material for three-dimensional modeling may contain other components in a range without impairing the effects of the present embodiment. Examples of the other components include a polyamide resin other than the polyamide resin described above, a polymer other than a polyamide resin, a plasticizer such as polyalkylenebenzoate glycol diester; and a filler such as calcium carbonate, magnesium carbonate, glass spheres, black lead, carbon black, carbon fibers, glass fibers, talc, wollastonite, mica, alumina, silica, kaolin, whisker, and silicon carbide.

[Support Material Removing Step]

The support material removing step is a step of contacting the precursor of the three-dimensional object to the composition of the agent for treating the precursor of the three-dimensional object to remove the support material. The method of contacting the precursor of the three-dimensional object to the composition of the agent for treating the precursor of the three-dimensional object may be soaking the precursor of the three-dimensional object in the treating agent and agitating, exposing the precursor of the three-dimensional object in a strong water flow, or moving the precursor of the three-dimensional object itself. However, from a viewpoint of preventing the precursor from breaking and a viewpoint of facilitating the work, a method is preferable of soaking the three-dimensional object in the composition of the agent for treating the precursor of the three-dimensional object. From a viewpoint of improving the removability of the support material, the three-dimensional object may be irradiated with ultrasonic waves while being soaked to promote the solubility of the support material.

From a viewpoint of preventing the corrosion of the three-dimensional object, the pH of the composition of the agent for treating the precursor of the three-dimensional object is preferably 6 to 8.

From a viewpoint of the solubility of the support material, the amount of the composition of the agent for treating the precursor of the three-dimensional object used to the amount of the support material is preferably 10 mass times or more and more preferably 20 mass times or more. From a viewpoint of workability, the amount of composition of the agent for treating the precursor of the three-dimensional object used to the amount of the support material is preferably 10,000 mass times or less, more preferably 5,000 mass times or less, further more preferably 1,000 mass times or less, and furthermore preferably 100 mass times or less.

From a viewpoint of the solubility of the support material, the temperature of the composition of the agent for treating the precursor of the three-dimensional object in the support material removing step is preferably 25° C. or higher and more preferably 40° C. or higher. From the same viewpoint, the temperature of the composition of the agent for treating the precursor of the three-dimensional object in the support material removing step is preferably 80° C. or lower and more preferably 70° C. or lower. From the combination of these viewpoints, the temperature of the composition of the agent for treating the precursor of the three-dimensional object in the support material removing step is preferably 25° C. to 80° C. and more preferably 40° C. to 70° C.

From a viewpoint of the removability of the support material, the time for the support material to get into contact with the composition of the agent for treating the precursor of the three-dimensional object is preferably 5 minutes or more. From a viewpoint of reducing damage to the three-dimensional object, the time for the support material to get into contact with the composition of the agent for treating the precursor of the three-dimensional object is preferably 180 minutes or less, more preferably 120 minutes or less, further preferably 90 minutes or less, and further preferably 60 minutes or less. From the combination of these viewpoints, the time for the support material to get into contact with the composition of the agent for treating the precursor of the three-dimensional object is preferably 5 minutes to 180 minutes, more preferably 5 minutes to 120 minutes, further preferably 5 minutes to 90 minutes, and further more preferably 5 minutes to 60 minutes.

The compositions and the manufacturing methods according to the embodiment described above are disclosed below in the present specification.

<1> A composition of an agent for treating a precursor of a three-dimensional object for removing a support material from the precursor of the three-dimensional object containing the three-dimensional object and the support material, the composition containing water and a water-soluble compound having a solubility parameter (SP value) calculated by using the Fedors' method of 8 (cal/cm$^3$)$^{1/2}$ to 13 (cal/cm$^3$) in.

<2> The composition of the agent for treating the precursor of the three-dimensional object according to <1>, wherein the SP value of the water-soluble compound is 8 (cal/cm$^3$)$^{1/2}$ or more, preferably 8.1 (cal/cm$^3$)$^{1/2}$ or more, more preferably 8.2 (cal/cm$^3$)$^{1/2}$ or more, 13 (cal/cm$^3$)$^{1/2}$ or less, preferably 12 (cal/cm$^3$)$^{1/2}$ or less, and more preferably 11 (cal/cm$^3$)$^{1/2}$ or less.

<3> The composition of the agent for treating the precursor of the three-dimensional object according to <1> or <2>, wherein the water-soluble compound is at least one type selected from the group consisting of the following formulas (1) to (4).

[Formula 13]

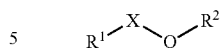

(1)

(In the formula (1), $R^1$ is an alkyl group having 2 to 22 carbon atoms, a hydroxy group, a benzyl group, an acetyl group, or an acetoxy group; and X is an alkylene group having 1 to 12 carbon atoms that may have a hydroxy group or a (EO)$_{m1}$(PO)$_{n1}$ group, wherein m1 is an average addition mole number of an oxyethylene group {-EO-} and an integer of 1 to 200, and n1 is an average addition mole number of an oxypropylene group {—PO—} and an integer of 0 to 50. $R^2$ is an alkyl group having 2 to 8 carbon atoms in a case $R^1$ is an alkyl group having 2 to 4 carbon atoms; $R_2$ is an alkyl group having 4 to 8 carbon atoms in a case $R^1$ is a hydroxy group and X is an alkylene group having 2 or 3 carbon atoms that has no hydroxy group; $R^2$ is an allyl group in a case $R^1$ is a hydroxy group and X is an alkylene group having 3 or 8 carbon atoms that has a hydroxy group; $R^2$ is an alkyl group having 2 to 8 carbon atoms in a case $R^1$ is an acetyl group, X is a (EO)$_{m1}$(PO)$_{n1}$ group, wherein m1 is an integer from 1 to 4, and n1 is 0; and $R^2$ is a hydrogen atom in a case $R^1$ is a benzyl group or an alkyl group having 5 to 22 carbon atoms, X is a (EO)$_{m1}$(PO)$_{n1}$ group, wherein m1 is an integer from 1 to 200, and n1 is 0 to 50.)

[Formula 14]

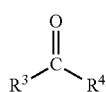

(2)

(In the formula (2), $R^3$ and $R^4$ are same or different; and $R^3$ and $R^4$ represent preferably an alkyl group having 1 to 4 carbon atoms, more preferably an alkyl group having 1 to 3 carbon atoms, and further preferably an alkyl group having 1 or 2 carbon atoms.)

[Formula 15]

$R^5$—OH (3)

(In the formula (3), $R^5$ represents preferably an alkyl group having 1 to 4 carbon atoms, more preferably an alkyl group having 1 to 3 carbon atoms, and further preferably an alkyl group having 2 or 3 carbon atoms.)

[Formula 16]

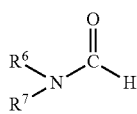

(4)

(In the formula (4), $R^6$ and $R^7$ are same or different; and $R^6$ and $R^7$ represent preferably a hydrogen atom or an alkyl group having 1 to 4 carbon atoms, more preferably an alkyl group having 1 to 3 carbon atoms, and further preferably an alkyl group having 1 or 2 carbon atoms.)

<4> The composition of the agent for treating the precursor of the three-dimensional object according to any one of <1> to <3>, wherein in the formula (1), $R^1$ is preferably an alkyl group having 2 to 22 carbon atoms, a hydroxy group, a benzyl group, an acetyl group, or an acetoxy group; more preferably an alkyl group having 2 to 12 carbon atoms, a hydroxy group, or an acetoxy group; further preferably an alkyl group having 2 to 8 carbon atoms, a hydroxy group, or an acetoxy group; further more preferably an alkyl group having 2 to 4 carbon atoms, a hydroxy group, or an acetoxy group; further more preferably an alkyl group having 2 to 4 carbon atoms or a hydroxy group; and further more preferably a hydroxy group.

<5> The composition of the agent for treating the precursor of the three-dimensional object according to any one of <1> to <4>, wherein in the formula (1), X is preferably an alkylene group having 1 to 12 carbon atoms that may have a hydroxy group or a $(EO)_{m1}(PO)_{n1}$ group, more preferably an alkylene group having 1 to 12 carbon atoms or a $(EO)_{m1}(PO)_{n1}$ group, and further preferably an alkylene group having 1 to 8 carbon atoms or a $(EO)_{m1}(PO)_{n1}$ group; m1 is preferably an integer of 1 to 200, more preferably an integer of 1 to 60, further preferably an integer of 1 to 10, and furthermore preferably 1 to 3; n1 is preferably an integer of 0 to 50, more preferably an integer of 1 to 10, and further preferably an integer of 1 to 3.

<6> The composition of the agent for treating the precursor of the three-dimensional object according to any one of <1> to <5>, wherein in the formula (1), $R^2$ is preferably an alkyl group having 2 to 8 carbon atoms and more preferably an alkyl group having 2 to 6 carbon atoms in a case $R^1$ is an alkyl group having 2 to 4 carbon atoms.

<7> The composition of the agent for treating the precursor of the three-dimensional object according to any one of <1> to <6>, wherein in the formula (1), $R^2$ is preferably an alkyl group having 4 to 8 carbon atoms and more preferably an alkyl group having 4 to 6 carbon atoms in a case $R^1$ is a hydroxy group and X is an alkylene group having 2 or 3 carbon atoms that has no hydroxy group.

<8> The composition of the agent for treating the precursor of the three-dimensional object according to any one of <1> to <7>, wherein in the formula (1), $R^2$ is preferably an alkyl group having 2 to 8 carbon atoms and more preferably an alkyl group having 2 to 6 carbon atoms in a case $R^1$ is an acetyl group, X is a $(EO)_{m1}(PO)_{n1}$ group, m1 is an integer from 1 to 4, and n1 is 0.

<9> The composition of the agent for treating the precursor of the three-dimensional object according to any one of <1> to <8>, wherein in the formula (1), $R^2$ is preferably a hydrogen atom in a case $R^1$ is a benzyl group or an alkyl group having 4 to 22 carbon atoms, X is a $(EO)_{m1}(PO)_{n1}$ group, m1 is an integer from 1 to 200, and n1 is 0 to 50.

<10> The composition of the agent for treating the precursor of the three-dimensional object according to any one of <1> to <9>, wherein the content of the water-soluble compound in the composition of the treating agent is preferably 1% by mass or more, more preferably 2% by mass or more, and further preferably 3% by mass or more, preferably 80% by mass or less, more preferably 60% by mass or less, and further preferably 40% by mass or less.

<11> The composition of the agent for treating the precursor of the three-dimensional object according to any one of <1> to <10>, wherein the content of the water in the composition of the treating agent is preferably 20% by mass or more, more preferably 40% by mass or more, further preferably 60% by mass or more, further more preferably 70% by mass or more, and especially preferably 75% by mass or more, preferably 99% by mass or less, more preferably 98% by mass or less, further preferably 97% by mass or less, furthermore preferably 95% by mass or less, further more preferably 93% by mass or less, further more preferably 90% by mass or less, and especially preferably 85% by mass or less.

<12> A method for manufacturing a three-dimensional object comprising: a modeling step of obtaining a precursor of the three-dimensional object containing a three-dimensional object and a support material by a fused deposition modeling system; and a support material removing step of contacting the precursor of the three-dimensional object to the composition of the agent for treating the precursor of the three-dimensional object according to anyone of <1> to <11> to remove the support material.

<13> The method for manufacturing the three-dimensional object according to <12>, wherein a soluble material for three-dimensional modeling that is a raw material of the support material contains a resin having a hydrophilic group.

<14> The method for manufacturing the three-dimensional object according to <12> or <13>, wherein the resin having a hydrophilic group is a polyester resin having a hydrophilic group and/or a polyamide resin having a hydrophilic group.

<15> The method for manufacturing the three-dimensional object according to any one of <12> to <14>, wherein the polyester resin has a hydrophilic monomer unit $A_1$ having a hydrophilic group, a hydrophobic dicarboxylic acid monomer unit $B_1$, and a diol monomer unit; wherein a ratio of the hydrophilic monomer unit $A_1$ to a total amount of the hydrophilic monomer unit $A_1$ having a hydrophilic group and the hydrophobic dicarboxylic acid monomer unit $B_1$ in the polyester resin is 10 mol % to 70 mol %.

<16> The method for manufacturing the three-dimensional object according to any one of <12> to <15>, wherein a monomer $A_1$ for deriving the hydrophilic monomer unit $A_1$ is more preferably at least one type selected from the group consisting of hydroxy group-containing aromatic dicarboxylic acid, primary amino group-containing aromatic dicarboxylic acid, sulfonic acid group-containing aromatic dicarboxylic acid, and sulfonate group-containing aromatic dicarboxylic acid; more preferably at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid; further preferably at least one type selected from the group consisting of 5-sulfoisophthalic acid and 2-sulfoterephthalic acid; and further more preferably 5-sulfoisophthalic acid.

<17> The method for manufacturing the three-dimensional object according to anyone of <12> to <16>, wherein the content of the hydrophilic group in the polyester resin is preferably 0.5 mmol/g or more, more preferably 0.6 mmol/g or more, and further preferably 0.7 mmol/g or more, preferably 3.0 mmol/g or less, more preferably 2.0 mmol/g or less, and further preferably 1.5 mmol/g or less, 0.5 mmol/g to 3.0 mmol/g, more preferably 0.6 mmol/g to 2.0 mmol/g, and further preferably 0.7 mmol/g to 1.5 mmol/g.

<18> The method for manufacturing the three-dimensional object according to any one of <12> to <17>, wherein the ratio of the amount of the hydrophilic monomer unit $A_1$ to the total amount of monomer units in the polyester resin is 5 mol % or more, preferably 7 mol % or more, more preferably 10 mol % or more, and further preferably 12 mol % or more, 35 mol % or less, preferably 33 mol % or less, more preferably 32 mol % or less, and further preferably 30 mol % or less, preferably 5 mol % to 35 mol %, more preferably 7 mol % to 33 mol %, further preferably 10 mol % to 32 mol %, and further more preferably 12 mol % to 30 mol %.

<19> The method for manufacturing the three-dimensional object according to any one of <12> to <18>, wherein a monomer $B_1$ for deriving the hydrophobic dicarboxylic acid monomer unit $B_1$ is preferably at least one type selected from the group consisting of aromatic dicarboxylic acid, aliphatic dicarboxylic acid, and alicyclic dicarboxylic acid, more preferably at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid, further preferably at least one type selected from the group consisting of terephthalic acid, 2,5-furan dicarboxylic acid, and 2,6-naphthalene dicarboxylic acid.

<20> The method for manufacturing the three-dimensional object according to any one of <12> to <19>, wherein the ratio of the amount of the hydrophobic dicarboxylic acid monomer unit $B_1$ in the polyester resin to the total amount of monomer units in the polyester resin is preferably 15 mol % or more, more preferably 18 mol % or more, and further preferably 20 mol % or more; preferably 45 mol % or less, more preferably 42 mol % or less, and further preferably 40 mol % or less; preferably 15 mol % to 45 mol %, more preferably 20 mol % to 42 mol %, and further preferably 30 mol % to 40 mol %.

<21> The method for manufacturing the three-dimensional object according to any one of <12> to <20>, wherein the mole ratio of the hydrophilic monomer unit $A_1$ to the hydrophobic dicarboxylic acid monomer unit $B_1$ (hydrophilic monomer unit $A_1$/hydrophobic dicarboxylic acid monomer unit $B_1$) is preferably 10/90 or more, more preferably 15/85 or more, further preferably 18/82 or more, and further more preferably 20/80 or more; preferably 70/30 or less, more preferably 65/35 or less, and further preferably 60/40 or less.

<22> The method for manufacturing the three-dimensional object according to any one of <12> to <21>, wherein the ratio of diethylene glycol to the total amount of all diol monomer units in the polyester resin is preferably 5 mol % or more, more preferably 10 mol % or more, further preferably 15 mol % or more, furthermore preferably 20 mol % or more, especially preferably 25 mol % or more, more especially preferably 30 mol % or more; and preferably 60 mol % or less, more preferably 55 mol % or less, further preferably 50 mol % or less, and further preferably 45 mol % or less.

<23> The method for manufacturing the three-dimensional object according to any one of <12> to <22>, wherein the ratio of the total amount of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene and biscresolfluorene to the total amount of all diol monomer units in the polyester resin is preferably 80 mol % or more, more preferably 90 mol % or more, further preferably 95 mol % or more, furthermore preferably 98 mol % or more, especially preferably substantially 100 mol %, and more especially preferably 100 mol %.

<24> The method for manufacturing the three-dimensional object according to any one of <12> to <23>, wherein the polyester resin is preferably a polyester resin α in which the ratio of the hydrophilic monomer unit $A_1$ in the total of all dicarboxylic acid monomer units, which include the hydrophilic monomer unit $A_1$, is 10 mol % to 70 mol %; the ratio of the dicarboxylic acid monomer units $B_1$ in the same total is 30 mol % to 90 mol %; and the dicarboxylic acid $B_1$ for obtaining the dicarboxylic acid monomer units $B_1$ is 2,6-naphthalene dicarboxylic acid.

<25> The method for manufacturing the three-dimensional object according to any one of <12> to <24>, wherein the weight average molecular weight of the polyester resin is preferably 3,000 or more, more preferably 8,000 or more, further preferably 10,000 or more preferably 80,000 or less, more preferably 70,000 or less, further preferably 60,000 or less, further more preferably 50,000 or less, preferably 60,000 or less, more preferably 50,000 or less, and further preferably 40,000 or less.

<26> The method for manufacturing the three-dimensional object according to any one of <12> to <25>, wherein the polyamide resin is a polyamide resin having a hydrophilic monomer unit $A_2$ having a hydrophilic group, a hydrophobic dicarboxylic acid monomer unit $B_2$, and a hydrophobic diamine monomer unit, in which the ratio of the hydrophilic monomer unit $A_2$ to the total amount of all monomer units in the polyamide resin is 2.5 mol % to 40 mol %.

<27> The method for manufacturing the three-dimensional object according to anyone of <12> to <26>, wherein the monomer $A_2$ for deriving the hydrophilic monomer unit $A_2$ is preferably at least one type selected from the group consisting of hydroxy group-containing aromatic dicarbxylic acid, primary amino group-containing aromatic dicarboxylic acid, sulfonic acid group-containing aromatic dicarboxylic acid, and sulfonate group-containing aromatic dicarboxylic acid, more preferably at least one type selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid, further preferably at least one type selected from the group consisting of 5-sulfoisophthalic acid and 2-sulfoterephthalic acid, further more preferably 5-sulfoisophthalic acid.

<28> The method for manufacturing the three-dimensional object according to anyone of <12> to <27>, wherein the content of the hydrophilic group in the polyamide resin is preferably 0.5 mmol/g or more, more preferably 0.6 mmol/g or more, and further preferably 0.7 mmol/g or more, preferably 3.0 mmol/g or less, more preferably 2.0 mmol/g or less, and further preferably 1.5 mmol/g or less, preferably 0.5 mmol/g to 3.0 mmol/g, more preferably 0.6 mmol/g to 2.0 mmol/g, and further preferably 0.7 mmol/g to 1.5 mmol/g.

<29> The method for manufacturing the three-dimensional object according to any one of <12> to <28>, wherein the ratio of the amount of the hydrophilic monomer unit $A_2$ to the total amount of monomer units in the polyamide resin is 2.5 mol % or more, preferably 4 mol % or more, more preferably 6 mol % or more, further preferably 8 mol % or more, and furthermore preferably 10 mol % or more, 40 mol % or less, preferably 35 mol % or less, more preferably 31 mol % or less, further preferably 25 mol % or less, further more preferably 20 mol % or less, especially preferably 15 mol % or less, more especially preferably 10 mol % or less, and more especially preferably 8 mol % or less, preferably 2.5 mol % to 40 mol %, more preferably 4 mol % to 35 mol %, further preferably 6 mol % to 31 mol %, further more preferably 8 mol % to 20 mol %, especially preferably 8 mol % to 15 mol %, and more especially preferably 8 mol % to 12 mol %.

<30> The method for manufacturing the three-dimensional object according to any one of <12> to <29>, wherein a dicarboxylic acid $B_2$ for deriving the hydrophobic dicarboxylic acid monomer unit $B_2$ is preferably at least one type selected from the group consisting of aromatic dicarboxylic acid, aliphatic dicarboxylic acid, and alicyclic dicarboxylic acid, more preferably at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid, further preferably at least one type selected from the group consisting of terephthalic acid, 2,5-furan dicarboxylic acid, and 2,6-naphthalene dicarboxylic acid, further more preferably terephthalic acid.

<31> The method for manufacturing the three-dimensional object according to any one of <12> to <30>, wherein the ratio of the amount of the hydrophobic dicarboxylic acid monomer unit $B_2$ in the polyamide resin to the total amount of monomer units in the polyamide resin is preferably 10 mol % or more, more preferably 20 mol % or more, further preferably 30 mol % or more, furthermore preferably 35 mol % or more, especially preferably 40 mol % or more, and more especially preferably 42 mol % or more, preferably 47.5 mol % or less, more preferably 45 mol % or less, further preferably 42 mol % or less, and furthermore preferably 40 mol % or less, preferably 10 mol % to 47.5 mol %, more preferably 20 mol % to 45 mol %, and further preferably 30 mol % to 42 mol %.

<32> The method for manufacturing the three-dimensional object according to any one of <12> to <31>, wherein the mole ratio of the hydrophilic monomer unit $A_2$ to the hydrophobic dicarboxylic acid monomer unit $B_2$ (hydrophilic monomer unit $A_2$/hydrophobic dicarboxylic acid monomer unit $B_2$) is preferably 10/90 or more, more preferably 15/85 or more, further preferably 18/82 or more, and further more preferably 20/80 or more, preferably 50/50 or less, more preferably 40/60 or less, further preferably 30/70 or less, and furthermore preferably 25/75 or less.

<33> The method for manufacturing the three-dimensional object according to any one of <12> to <32>, wherein the weight average molecular weight of the polyamide resin is preferably 3,000 or more, more preferably 3, 500 or more, further preferably 4,000 or more, preferably 70,000 or less, more preferably 50,000 or less, further preferably 30,000 or less, and further more preferably 20,000 or less.

<34> The method for manufacturing the three-dimensional object according to any one of <12> to <33>, wherein the glass transition temperature of the resin having a hydrophilic group is preferably 50° C. or higher, more preferably 60° C. or higher, further preferably 70° C. or higher, and furthermore preferably 80° C. or higher, preferably 250° C. or lower, more preferably 220° C. or lower, and further preferably 200° C. or lower.

<35> The method for manufacturing the three-dimensional object according to anyone of <12> to <34>, wherein the content of the resin having a hydrophilic group in the soluble material for three-dimensional modeling is preferably 30% by mass or more, more preferably 50% by mass or more, further preferably 60% by mass or more, even more preferably 70% by mass or more, even more preferably 80% by mass or more, even more preferably 90% by mass or more, even more preferably 95% by mass or more, even more preferably substantially 100% by mass, and even more preferably 100% by mass.

<36> The method for manufacturing the three-dimensional object according to any one of <12> to <35>, wherein the glass transition temperature of the soluble material for three-dimensional modeling is preferably 50° C. or higher, more preferably 60° C. or higher, further preferably 70° C. or higher, and further more preferably 80° C. or higher, preferably 250° C. or lower, more preferably 220° C. or lower, and further preferably 200° C. or lower.

<37> The method for manufacturing the three-dimensional object according to any one of <12> to <36>, wherein the pH of the composition of the agent for treating the precursor of the three-dimensional object is preferably 6 to 8.

<38> The method for manufacturing the three-dimensional object according to any one of <12> to <37>, wherein the amount of the composition of the agent for treating the precursor of the three-dimensional object used to the amount of the support material is preferably 10 mass times or more and more preferably 20 mass times or more, preferably 10,000 mass times or less, more preferably 5,000 mass times or less, further more preferably 1,000 mass times or less, and furthermore preferably 100 mass times or less.

<39> The method for manufacturing the three-dimensional object according to any one of <12> to <38>, wherein the temperature of the composition of the agent for treating the precursor of the three-dimensional object in the support material removing step is preferably 25° C. or higher and more preferably 40° C. or higher, preferably 80° C. or lower and more preferably 70° C. or lower, preferably 25° C. to 80° C. and more preferably 40° C. to 70° C.

<40> The method for manufacturing the three-dimensional object according to any one of <12> to <39>, wherein the time for the support material to get into contact with the composition of the agent for treating the precursor of the three-dimensional object is preferably 5 minutes or more, preferably 180 minutes or less, more preferably 120 minutes or less, further preferably 90 minutes or less, and further preferably 60 minutes or less, preferably 5 minutes to 180 minutes, more preferably 5 minutes to 120 minutes, further preferably 5 minutes to 90 minutes, and further more preferably 5 minutes to 60 minutes.

<41> Use of the composition according to any one of <1> to <12> as an agent for treating a precursor of the three-dimensional object.

EXAMPLES

<Production of Evaluation Samples (Soluble Material for Three-Dimensional Modeling)>
[Polyester Resin]

Synthesis Example 1

388 g of 2,6-naphthalene dimethylcarbonate (first grade, manufactured by Tokyo Chemical Industry Co., Ltd.), 51.5 g of sodium dimethyl 5-sulfoisophthalate (manufactured by Wako Pure Chemical Corporation), 99.9 g of bisphenoxyethanolfluorene (manufactured by Tokyo Chemical Industry Co., Ltd.), 32.4 g of ethylene glycol, 14 mg of titanium tetrabutoxide (first grade, manufactured by Tokyo Chemical Industry Co., Ltd.), and 642 mg of sodium acetate (special grade, manufactured by Wako Pure Chemical Corporation) were prepared in a 2-liter stainless steel separable flask (equipped with a Claisen distillation head, a stirrer and a nitrogen introducing tube). The outside temperature was increased from 190° C. up to 260° C. by taking 6.5 hours using a mantle heater at a normal pressure under a nitrogen atmosphere for 4 hours. The mixture was kept at 260° C. and stirred for 6.5 hours to perform a transesterification. While stirring, the outside temperature was increased from 260° C. up to 290° C. by taking 1 hour; at the same time, the pressure was decreased from a normal pressure to 5.2 kPa; the outside temperature was increased from 290° C. up to 300° C. by taking 2.5 hours; and at the same time, the pressure was decreased from 550 Pa to 290 Pa to perform a polycondensation. A polyester compound 1 (a light brown solid at room temperature) was obtained. The weight average molecular weight (Mw) was 11,000 and the glass transition temperature was 173° C. The weight average molecular weight and the glass transition temperature of the polyester resin 1 were measured with the following methods.

Synthesis Example 2

A polyester resin 2 (a light brown solid at room temperature) was obtained in the same way as the synthesis example 1 except the amount of 2,6-naphthalene dimethylcarbonate was changed to 23.7 g, the amount of sodium dimethyl 5-sulfoisophthalate was changed to 45.5 g, the amount of bisphenoxyethanolfluorene was changed to 98.9 g, the amount of ethylene glycol was changed to 21.8 g, the amount of titanium tetrabutoxide was changed to 23.9 mg, and the amount of sodium acetate was changed to 756 mg. The weight average molecular weight was 9,000 and the glass transition temperature was 196° C.
[Weight Average Molecular Weight (Mw) of Polyester Resin]
The weight average molecular weight (Mw) of each of the polyester resins 1 and 2 was measured by a gel permeation chromatography (GPC). A polystyrene standard was used to make a calibration curve and the following conditions were used in the analysis.
(Measurement Conditions)
  Equipment: HLC-8320GPC (manufactured by TOSOH Corporation, detector integrated)
  Column: α-M×2 columns (manufactured by TOSOH Corporation, 7.8 mm I.D.×30 cm)
  Eluent: 60 mmol/L phosphoric acid+50 mmol/L lithium bromide dimethylformamide solution
  Flow rate: 1.0 mL/min
  Column temperature: 40° C.
  Detector: RI detector
  Standard: Polystyrene
[Glass Transition Temperature of Polyester Resin]
A press machine ("LABO PRESS P2-30T" manufactured by Toyo Seiki Seisaku-sho, Ltd.) was used to press a sample with a pressure of 20 MPa at 200° C. for 2 minutes and the pressed sample was rapidly cooled to produce a sheet of 0.4 mm thick. 5 mg to 10 mg of a sample was cut from the sheet with a pair of scissors. The sample was weighed and sealed in an aluminum pan. By using a DSC ("DSC7020" manufactured by Seiko Instruments Inc.), the temperature of the aluminum pan with the sample was increased from 30° C. to 250° C. at 10° C./min and the heated aluminum pan with the sample was rapidly cooled to 30° C. Then, the temperature of the aluminum pan with the sample was increased again to 250° C. at 10° C./min to obtain a DSC curve. The glass transition temperature (° C.) of each of the polyester resins 1 and 2 was obtained from the DSC curve.
[Polyamide Resin]

Synthesis Example 3

1.16 g of terephthalic acid, 1.16 g of isophthalic acid, 1.61 g of sodium 5-sulfoisophthalate, 2.32 g of hexamethylene diamine, 4.04 g of 4-methylmorpholine, and 50 g of N-methylpyrrolidone were prepared in a 100-mL stainless steel reactor equipped with a thermometer and a stirrer. The temperature was decreased to 0° C. Then, 13.8 g of 4-(4,6-dimethoxy-1,3,5-triazine-2-yl)-4-methylmorpholinium chloride was added, the temperature was kept at 0° C., and the mixture was continuously stirred at atmosphere for 6 hours. After stirring, the mixture was poured to a DMF/methanol mixed solution to precipitate a polymer. The polymer was filtered and dried at 60° C. with a reduced pressure to obtain a white solid (polyamide resin 1). The weight average molecular weight (Mw) was 7,200 and the glass transition temperature was 142° C. The weight average molecular weight and the glass transition temperature of the polyamide resin were measured with the following methods.
[Weight Average Molecular Weight (Mw) of Polyamide Resin] 10 mg of the polyamide resin was dissolved into 3 g of HFIP (1,1,1,3,3,3-hexafluoro-2-propanol, manufactured by Wako Pure Chemical Corporation) for 8 hours and the weight average molecular weight (Mw) was measured by a gel permeation chromatography (GPC).
  Tester: HLC-8320GPC (manufactured by TOSOH Corporation)
  Eluent: HFIP/0.5 mM sodium trifluoroacetate
  Flow rate: 0.2 mL/min
  Test temperature: 40° C.
  Column for analysis: TSK-Gel Super AWM-H (manufactured by TOSOH Corporation)
  Calibration curve: Shodex STANDARD M-75
  Standard: Polymethylmethacrylate (PMMA)
[Glass Transition Temperature of Polyamide Resin]
A press machine ("LABO PRESS P2-30T" manufactured by Toyo Seiki Seisaku-sho, Ltd.) was used to press a sample with a pressure of 20 MPa at 200° C. for 2 minutes and the pressed sample was rapidly cooled to produce a sheet of 0.4 mm thick. 5 mg to 10 mg of a sample was cut from the sheet with a pair of scissors. The sample was weighed and sealed in an aluminum pan. By using a DSC ("DSC7020" manufactured by Seiko Instruments Inc.), the temperature of the aluminum pan with the sample was increased from 30° C. to 250° C. at 10° C./min and the heated aluminum pan with the sample was rapidly cooled to 30° C. Then, the temperature of the aluminum pan with the sample was increased again to 250° C. at 10° C./min to obtain a DSC curve. The glass transition temperature (° C.) was obtained from the DSC curve.
<Evaluation Methods>
[Dissolution Rate into Composition of Agent for Treating] [Polyester Resins 1 and 2]
Each of the polyester resin 1 and the polyester resin 2 was ground (grinding time was 120 seconds) by a coffee mill ("Mini Blender" manufactured by Osaka Chemical Co., Ltd.) into polymer powder. 0.25 g of the polymer powder of each of the polyester resins 1 and 2 was dispersed into 5 g of a 20% aqueous solution of the water-soluble compound described in Table 1 (However, a 5% aqueous solution was used in Example 16). The dispersion was left to stand at 70° C. for 5 minutes. The dispersion was lightly shaken to re-disperse the polymer powder and left to stand at 70° C. for 5 minutes. The polymer left undissolved was filtered at a reduced pressure (a filter paper No. 5C/70 mm manufactured by Advantec Co. Ltd.), the filtered polymer was washed with a small amount of ion exchanged water and dried. The dry mass of the undissolved polymer was measured and the dissolution rate was calculated using the following formula. The evaluation results of the polyester resin 1 were shown in Table 1 and the evaluation results of the polyester resin 2 were shown in Table 2.

Dissolution Ratio (%)=(Mass of Polymer before Dissolution−Mass of Polymer undissolved)/Mass of Polymer before Dissolution×100

[Polyamide Resin 1]

The polyamide resin 1 was ground into polymer powder using mortar and pestle. 0.1 g of the polymer powder was dispersed into 2 g of a 40% by mass 1,1,1,3,3,3-hexafluoro-2-propanol mixed aqueous solution (0.4 g of organic solvent and 0.6 g of ion exchanged water). The dispersion was left to stand at 70° C. for 5 minutes. The dispersion was lightly shaken to re-disperse the polymer powder and left to stand at 70° C. for 5 minutes. The polymer left undissolved was filtered at a reduced pressure (a filter paper No. 5C/70 mm manufactured by Advantec Co. Ltd.), the filtered polymer was washed with a small amount of ion exchanged water and dried. The dry mass of the undissolved polymer was measured and the dissolution rate was calculated using the following formula. The evaluation results were shown in Table 2.

Dissolution Ratio (%)=(Mass of Polymer before Dissolution−Mass of Polymer undissolved)/Mass of Polymer before Dissolution×100

[Commercially Available Polyamide Resin]

The solubility was evaluated of AQ Nylon A-90 and AQ Nylon P-70 (manufactured by Toray Industries, Inc.) as a commercially available polyamide resin into the composition of the treating agent. AQ Nylon A-90 is a polyamide resin containing a tertiary amino group as a hydrophilic group, and AQ Nylon P-70 is a polyamide resin containing an oxyethylene group as a hydrophilic group. The weight average molecular weight was obtained with the same method as the polyester resin except a 50 mmol/L dimethylformamide solution was used an eluent of AQ Nylon A-90. The weight average molecular weight of AQ Nylon A-90 was 23,600 and the weight average molecular weight of AQ Nylon P-70 was 60,600. The glass transition temperature of AQ Nylon A-90 described in the catalog was 46° C. and the glass transition temperature of AQ Nylon P-70 described in the catalog was 47° C. The dissolution ratio of the polyamide resin to the composition of the treating agent was evaluated with the same method as the polyester resin except the measurement of the dissolution ratio of AQ Nylon A-90 was performed at room temperature. The dissolution ratio of AQ Nylon P-70 was too soft to grind with a coffee mill. Therefore, the dissolution ratio of AQ Nylon P-70 was evaluated in a form of pellet. The evaluation results are shown in Table 2.

[Evaluation of Damage to Modeling Material by Composition of Treating Agent]

3.0 cm of the commercially available ABS resin filament for a 3D printer ("ABS-P430 Model" manufactured by Stratasys Ltd.) was cut out and its weight was precisely measured. The weighed ABS resin filament was soaked in 5 g of a 20% by weight ethylene glycol-t-butylether aqueous solution or ethylene glycol-t-butylether at 70° C. for 3 hours. The filament was taken out the composition of the treating agent and its weight was measured. The filament treated by the composition of the treating agent was dried at room temperature overnight. Then, a bending test was performed on the dried filament. The filament soaked only in ethylene glycol-t-butylether was swollen. The evaluation results are shown in Table 3.

The weight of 5 cm of a polyetherimide filament ("ULTEM1010" manufactured by Stratasys Ltd.) was precisely measured. The weighed polyetherimide filament was soaked in 10 g of 5% by mass diethylene glycol-n-butylether or 10 g of N,N-dimethylformamide at 70° C. for 1 hour. Then, the filament was taken out and its weight was measured. The filament was dried and a bending test was performed. The weight of the filament soaked in N,N-dimethylformamide decreased and its shape largely changed. The evaluation results are shown in Table 3.

[Bending Test]

A filament was bent by hands at 90°. A number of the bending repeated until the filament broke was obtained (N=2). The evaluation results are shown in Table 3.

TABLE 1

| | Water-Soluble Compound | Structure | SP Value of Solvent (cal/cm³)^0.5 | Dissolution Rate |
|---|---|---|---|---|
| Example 1 | Ethylene glycol mono t-butylether (Manufactured by Tokyo Chemical Industry Co., Ltd.) | HO-CH₂CH₂-O-t-Bu | 10.5 | 80% |
| Example 2 | Ethylene glycol mono n-butylether (Manufactured by Tokyo Chemical Industry Co., Ltd.) | HO-CH₂CH₂-O-n-Bu | 10.8 | 78% |
| Example 3 | Diethylene glycol diethylether (Manufactured by Tokyo Chemical Industry Co., Ltd.) | Et-O-CH₂CH₂-O-CH₂CH₂-O-Et | 8.2 | 82% |
| Example 4 | Diethylene glycol mono benzylether (Manufactured by Tokyo Chemical Industry Co., Ltd.) | HO-CH₂CH₂-O-CH₂CH₂-O-CH₂-C₆H₅ | 10.8 | 99% |
| Example 5 | 3-Allyloxy-1,2-propanediol (manufactured by Wako Pure Chemical Corporation) | CH₂=CH-CH₂-O-CH₂-CH(OH)-CH₂OH | 12.2 | 38% |

TABLE 1-continued

| | Water-Soluble Compound | Structure | SP Value of Solvent (cal/cm^3)^0.5 | Dissolution Rate |
|---|---|---|---|---|
| Example 6 | Diethylene glycol monoethyletheracetate (Manufactured by Tokyo Chemical Industry Co., Ltd.) | | 9.0 | 81% |
| Example 7 | Methylethylketone (manufactured by Wako Pure Chemical Corporation) | | 9.0 | 32% |
| Example 8 | Isopropylalcohol (manufactured by Wako Pure Chemical Corporation) | | 10.2 | 21% |
| Example 9 | Dimethylformamide (manufactured by Wako Pure Chemical Corporation) | | 10.2 | 38% |
| Example 10 | Polyoxyethylenelaurylether ("EMULGEN 108" manufactured by Kao Corporation) | $C_{12}H_{25}EO_8$ | 9.3 | 48% |
| Example 11 | EMULGEN 109 (manufactured by Kao Corporation) | $C_{12}H_{25}EO_9$ | 10.3 | 45% |
| Example 12 | EMULGEN 150 (manufactured by Kao Corporation) | $C_{12}EO_{47}$ | 9.4 | 23% |
| Example 13 | EMULGEN 709 (manufactured by Kao Corporation) | $sec\text{-}_{12\text{-}4}EO_9$ | 9.3 * 1 | 48% |
| Example 14 | 3-propoxypropane-1,2-diol (prepared with a method described in the specification of Japanese Patent 4980045) | | 12.2 | 50% |
| Example 15 | Pentylglycelylether (manufactured by Kao Corporation) | | 11.3 | 65% |
| Comparative Example 1 | Ethylene glycol (manufactured by Wako Pure Chemical Corporation) | | 14.8 | 5% |
| Comparative Example 2 | Diethylene glycol monohexylether (Manufactured by Tokyo Chemical Industry Co., Ltd.) | | 9.7 | 2% |
| Comparative Example 3 | Dimethylsulfoxide (manufactured by Wako Pure Chemical Corporation) | | Impossible to calculate | 7% |
| Comparative Example 4 | Polyoxyrthylenelaurylether sodium sulfate ("EMAL 270J" manufactured by Kao Corporation) | $C_{12}H_{25}EO_2SO_3Na$ | Impossible to calculate | 3% |
| Comparative Example 5 | Water | | 23.4 | 22% |

* Calculation was performed with "C" equal to 13.

TABLE 2

| | Polymer Type | Glass Transition Temperature | Composition of Treating Agent | SP Value of Solvent (cal/cm^3)^0.5 | Washing Temperature | Dissolution Rate |
|---|---|---|---|---|---|---|
| Example 16 | Polyester Resin 2 | 196° C. | 5% by mass diethylene glycol mono n-butylether aqueous solution | 10.5 | 70° C. | 99% |
| Example 17 | Polyester Resin 2 | 196° C. | 20% by mass diethylene glycol mono n-butylether aqueous solution | 10.5 | 70° C. | 89% |
| Example 18 | Polyamide Resin 1 | 142° C. | 40% by mass 1,1,1,3,3,3-hexafluoro-2-propanol | 9.0 | 70° C. | 74% |
| Example 19 | AQ Nylon A-90 | 46° C. * 1 | 20% by mass diethylene glycol monobenzylether aqueous solution | 10.8 | Room Temperature | 74% |
| Example 20 | AQ Nylon P-70 | −47° C. * 1 | 20% by mass N,N-dimethylformamide aqueous solution | 10.2 | 70° C. | 44% |
| Comparative Example 6 | Polyester Resin 2 | 196° C. | Water | 23.4 | 70° C. | 8% |
| Comparative Example 7 | Polyamide Resin 1 | 142° C. | Water | 23.4 | 70° C. | 22% |
| Comparative Example 8 | AQ Nylon A-90 | 46° C. * 1 | Water | 23.4 | Room Temperature | 67% |
| Comparative Example 9 | AQ Nylon A-90 | 46° C. * 1 | 20% by mass ethylene glycol aqueous solution | 14.8 | Room Temperature | 61% |
| Comparative Example 10 | AQ Nylon P-70 | −47° C. * 1 | Water | 23.4 | 70° C. | 32% |

* 1: From the Toray catalog

TABLE 3

| | | Conditions for Damage Test to Modeling Material | | | Test Results | | |
|---|---|---|---|---|---|---|---|
| | Modeling Material | Composition of Treating Agent | Soaking Temperature | Soaking Times | Weight Change | Appearance | Bending Test *3 |
| Example 21 | ABS * 1 | 20% by mass ethylene glycol-t-butylether aqueous solution | 70° C. | 3 hours | −2% | No change | 16 times |
| Example 22 | PEI * 2 | 5% by mass diethylene glycol-n-butylether aqueous solution | 70° C. | 1 hour | +0.1% | No change | Impossible to break *3 |
| Comparative Example 11 | ABS * 1 | Diethylene glycol-t-butylether | 70° C. | 3 hours | +22% | Swollen | 6 times |
| Comparative Example 12 | PEI * 2 | N,N-dimethyformamide | 70° C. | 1 hour | −81% | Dissolved | 1 time |

* 1: ABS resin filament ("ABS P430 Model" manufactured by Stratasys Ltd.)
* 2: Polyetherimide resin filament ("ULTEM1010" manufactured by Stratasys Ltd.)
*3: When the modeling material was ABS, the filament which was not soaked in a detergent was broken after bending was performed 15 times and when the modeling material was PEI, the filament could not be bent to 90° and could not be broken.

The invention claimed is:

1. A method for manufacturing a three-dimensional object, the method comprising:
    obtaining a precursor of the three-dimensional object containing the three-dimensional object and a support material by a fused deposition modeling system; and
    contacting the precursor with a composition to remove the support material,
    wherein
    the composition comprises water and a water-soluble compound having a solubility parameter of 8 $(cal/cm^3)^{1/2}$ to 13 $(cal/cm^3)^{1/2}$ calculated by the Fedors' method, and
    a soluble material, which is a material of the support material, contains a resin having a hydrophilic group, which is at least one of a polyester resin having a hydrophilic group and a polyamide resin having a hydrophilic group, and
    the composition is neutral and has a pH of 6 to 8.

2. The method according to claim 1, wherein
    the resin having a hydrophilic group is a polyester resin, which comprises
    a hydrophilic monomer unit $A_1$ having a hydrophilic group,
    a hydrophobic dicarboxylic acid monomer unit $B_1$, and
    a diol monomer unit; and
    a ratio of the hydrophilic monomer unit $A_1$ to a total amount of the hydrophilic monomer unit $A_1$ and the hydrophobic dicarboxylic acid monomer unit $B_1$ in the polyester resin is 10 mol % to 70 mol %.

3. The method according to claim 2, wherein a monomer $A_1$ for deriving the hydrophilic monomer unit $A_1$ is at least one selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid.

4. The method according to claim 2, wherein a monomer $B_1$ for deriving the hydrophobic dicarboxylic acid monomer unit $B_1$ is at least one selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid.

5. The method according to claim 1, wherein
    the resin having a hydrophilic group is a polyamide resin, which comprises
    a hydrophilic monomer unit $A_2$ having a hydrophilic group,
    a hydrophobic dicarboxylic acid monomer unit $B_2$, and
    a hydrophobic diamine monomer unit; and a ratio of the hydrophilic monomer unit $A_2$ to a total amount of all monomer units in the polyamide resin is 2.5 mol % to 40 mol %.

6. The method according to claim 5, wherein a monomer $A_2$ for deriving the hydrophilic monomer unit $A_2$ is at least one selected from the group consisting of 5-hydroxyisophthalic acid, 1,3,5-benzene tricarboxylic acid, 5-aminoisophthalic acid, 5-sulfoisophthalic acid, 2-sulfoterephthalic acid, and 4-sulfo-2,6-naphthalene dicarboxylic acid.

7. The method according to claim 5, wherein a content of the hydrophilic group in the polyamide resin is 0.5 mmol/g to 3.0 mmol/g.

8. The method according to claim 1, wherein a glass transition temperature (Tg) of the resin having a hydrophilic group is 50° C. to 250° C.

9. The method according to claim 1, wherein a glass transition temperature (Tg) of the soluble material is 50° C. to 250° C.

10. The method according to claim 1, wherein the water-soluble compound in the composition is at least one compound of formula (1):

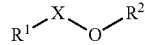

wherein
$R^1$ is a benzyl group, $R^2$ is a hydrogen atom, and X is a $(EO)_{m1}(PO)_{n1}$ group, wherein m1 is an integer of 1 to 200, and n1 is 0 to 50; or
$R^1$ is an alkyl group having 4 to 22 carbon atoms, $R^2$ is a hydrogen atom, and X is a $(EO)_{m1}(PO)_{n1}$ group, wherein m1 is an integer of 2 to 200, and n1 is 0 to 50.

11. The method according to claim 1, wherein a content of the water-soluble compound in the composition ranges from 1% by mass to 80% by mass.

* * * * *

UNITED STATES PATENT AND TRADEMARK OFFICE
CERTIFICATE OF CORRECTION

| | | |
|---|---|---|
| PATENT NO. | : 11,326,020 B2 | Page 1 of 1 |
| APPLICATION NO. | : 16/323354 | |
| DATED | : May 10, 2022 | |
| INVENTOR(S) | : Tadanori Yoshimura, Hiroki Sawada and Akihiro Onoue | |

It is certified that error appears in the above-identified patent and that said Letters Patent is hereby corrected as shown below:

On the Title Page

Item (72):
"Akihiro Onoue, Nakayama (JP)"
Should read:
--Akihiro Onoue, Wakayama (JP)--

Signed and Sealed this
Fifth Day of July, 2022

Katherine Kelly Vidal
*Director of the United States Patent and Trademark Office*